(12) United States Patent
Takeda

(10) Patent No.: US 8,843,311 B2
(45) Date of Patent: Sep. 23, 2014

(54) DRIVE SYSTEM FOR UNMANNED VEHICLE AND METHOD OF DRIVE CONTROL OF THE SAME

(75) Inventor: Koji Takeda, Tama (JP)

(73) Assignee: Komatsu Ltd., Tokyo (JP)

( * ) Notice: Subject to any disclaimer, the term of this patent is extended or adjusted under 35 U.S.C. 154(b) by 74 days.

(21) Appl. No.: 13/634,446

(22) PCT Filed: Jul. 14, 2011

(86) PCT No.: PCT/JP2011/066060
§ 371 (c)(1),
(2), (4) Date: May 1, 2013

(87) PCT Pub. No.: WO2012/008516
PCT Pub. Date: Jan. 19, 2012

(65) Prior Publication Data
US 2013/0211712 A1    Aug. 15, 2013

(30) Foreign Application Priority Data

Jul. 16, 2010    (JP) .................... 2010-161659

(51) Int. Cl.
*G01C 21/00* (2006.01)
*E02F 9/20* (2006.01)
*G01C 21/34* (2006.01)

(52) U.S. Cl.
CPC .......... *G01C 21/3407* (2013.01); *E02F 9/0245* (2013.01); *E02F 9/205* (2013.01)
USPC ................. 701/468; 701/50; 701/24; 701/25; 701/410; 701/411; 340/439; 340/988; 340/436; 340/438; 340/441

(58) Field of Classification Search
CPC ... G05D 1/027; G05D 1/0278; G05D 1/0236; G05D 1/024; G05D 1/0257; G05D 1/0272; G05D 1/0295; G05D 1/0297; G05D 2201/0202; G05D 2201/021; E02F 3/842; E02F 9/2045; E02F 9/205
USPC ................. 701/24, 50, 25, 410, 411, 468, 412
See application file for complete search history.

(56) References Cited

U.S. PATENT DOCUMENTS 5,631,658 A * 5/1997 Gudat et al. .................. 342/457
5,806,016 A * 9/1998 Henderson et al. ........... 701/408

(Continued)

FOREIGN PATENT DOCUMENTS

JP    05-297942 A    11/1993
JP    06-083443 A    3/1994

(Continued)

OTHER PUBLICATIONS

International Search Report of the International Searching Authority mailed Aug. 16, 2012 for the corresponding international application No. PCT/JP2011/066060 (with English translation).

(Continued)

*Primary Examiner* — Redhwan K Mawari
(74) *Attorney, Agent, or Firm* — Posz Law Group, PLC

(57) ABSTRACT

In giving a travel command to an unmanned vehicle in both-side loading, or in setting a position of a loading point in both-side loading, whether a working machine of a loading machine is positioned on left-loading point side or right-loading point side is discriminated in correlation between an orientation or a position of the working machine when the travel command is instructed and a direction or a position of the boundary line. In setting the position of the loading point in both-side loading, whether the working machine of the loading machine is positioned on left-loading point side or right-loading point side is discriminated in correlation between the orientation or the position of the working machine when position setting of loading point is instructed and the direction or the position of the boundary line.

12 Claims, 11 Drawing Sheets

(56) References Cited

U.S. PATENT DOCUMENTS

| | | | |
|---|---|---|---|
| 5,850,341 A * | 12/1998 | Fournier et al. | 701/50 |
| 5,925,081 A * | 7/1999 | Hawkins et al. | 701/24 |
| 6,044,312 A * | 3/2000 | Sudo et al. | 701/25 |
| 2013/0211712 A1 * | 8/2013 | Takeda, Koji | 701/468 |

FOREIGN PATENT DOCUMENTS

| | | |
|---|---|---|
| JP | 08-263138 A | 10/1996 |
| JP | 10-181889 A | 7/1998 |
| JP | 10-212035 A | 8/1998 |
| JP | 11-293708 A | 10/1999 |
| JP | 2009-023753 A | 2/2009 |

OTHER PUBLICATIONS

International Preliminary Report on Patentability and Written Opinion of the International Searching Authority issued Feb. 12, 2013 in the corresponding International Patent Application No. PCT/JP2011/066060 (and English translation).

* cited by examiner

DRIVE SYSTEM FOR UNMANNED VEHICLE AND METHOD OF DRIVE CONTROL OF THE SAME

CROSS REFERENCE TO RELATED APPLICATIONS

This application is a U.S. national stage application of PCT/JP2011/066060 filed on Jul. 14, 2011, and claims priority to, and incorporates by reference, Japanese Patent Application No. 2010-161659 filed on Jul. 16, 2010.

TECHNICAL FIELD

The present invention relates to a drive system for unmanned vehicle and a method of drive control of the same, and particularly, relates to a drive system for unmanned vehicle and a drive control method for the same for causing an unmanned vehicle to travel along a travel route to a loading point where there exists a loading machine.

BACKGROUND ART

In the wide-area working site of quarries, mines, and the like, in performing an earth and sand transportation work, it is required to intend avoidance of an accident due to the fatigue of a worker driving an off-road dump truck, manpower saving, and improvement of the productivity by prolonging the working time. Then, instead of using a manned vehicle, for example, a manned off-road dump truck, an unmanned vehicle drive system for operating an unmanned off-road dump truck has been introduced. Off-road dump trucks include that which uses a diesel engine as a power source to drive the wheels for traveling, and that which drives the diesel engine to operate a power generator, and uses the generated electric power to drive an electric motor for transmitting the driving force of the electric motor to the wheels for traveling.

The working site where an off-road dump truck(s) travels has particular areas, such as a loading site, and an earth removing site. These particular areas are mutually jointed by a maintained transportation road, called a haul road, side-tracks extending from the haul road to the particular areas, called access roads, and junctions.

The loading site, which is one of the areas, is a site where earth and sand are loaded onto an off-road dump truck (in the present invention, to be referred to as an unmanned vehicle), and in this site, an excavation work and an operation of loading a load, such as earth and sand, and the like, onto the unmanned vehicle are performed, using a working vehicle (in the present invention, to be referred to as a loading machine), such as a shovel (for example, a hydraulic excavator), a backhoe, and a wheel loader.

(Single-Side Loading)

FIG. 12 illustrates a case where single-side loading is performed in a loading site 1. As shown in the same FIG. 12, the single-side loading is a loading operation in which there is generated a travel route 10 for causing an unmanned vehicle 20 to travel from an entrance point 11 of the loading site 1 to a loading point 12, where a loading machine 30 exists, and the unmanned vehicle 20 is traveled under travel control along the generated travel route 10, and at the loading point 12, is loaded with a load by the loading machine 30. In other words, the single-side loading is a loading operation in which the unmanned vehicle 20 is caused to travel to a single side of either left or right side with respect to the loading machine 30, and is stopped at the loading point 12 during the loading operation. Herein, the travel route 10 includes a path from the entrance point 11 to a waiting point 14, and a final approach 16, which is a path from the waiting point 14 to the loading point 12. The path from the loading point 12 to an exit point 15 is referred to as an exit route 17 (17L, 17R).

The loading machine 30 is, for example, a hydraulic excavator, having a base carrier 30A with a crawler, and an upper slewing structure 30B which is slewable leftward and rightward. To the upper slewing structure 30B, a working machine 30C equipped with a boom, arm, and bucket is connected, and by operating the working machine 30C, the earth and sand, and the like, are scooped up for making an operation of loading them onto the unmanned vehicle 20. In other words, the loading point 12 indicates the position of a vessel (that which is loaded with a load) provided for the unmanned vehicle 20, and that of the bucket of the loading machine 30. In one form of single-side loading, the unmanned vehicle 20 is traveled to the front of the loading machine 30 for making a loading operation.

In this case, the unmanned vehicle 20 is led from the entrance point 11 to the loading point 12 through the waiting point 14 or a switch-back point 13 in the vicinity of the loading point 12. The waiting point 14 is a site where the unmanned vehicle 20 is stopped for waiting until it receives an instruction from the loading machine 30. In addition, the waiting point 14 can be a point which is the switch-back point 13 where, after having traveled in the forward travel mode, the unmanned vehicle 20 makes a switch-back operation for making an approach to the loading point 12 of the loading machine 30 in the backward travel mode. However, depending upon the form of loading, the switch-back is not always required. For example, the unmanned vehicle 20 may draw a circular arc from the entrance point 11 toward the loading machine 30 to reach the loading point 12. In addition, as described above, the switch-back point 13 may be identical to the waiting point 14.

The loading machine 30 excavates a working face 1a in the loading site 1 by use of the working machine 30C mounted to the upper slewing structure 30B. As the working face 1a, a scarp in the working site in a mine, or the like, is assumed. And, by the operator of the loading machine 30 operating an operation lever (not shown), the upper slewing structure 30B is slewed with respect to the base carrier 30A to position the working machine 30C at the loading point 12 for loading a load onto the unmanned vehicle 20.

At the completion of the loading operation, the unmanned vehicle 20 leaves the loading point 12 in accordance with a travel command for traveling toward the exit point 15 of the loading site 1.

In doing such a series of operations, the operator of the loading machine 30 gives the following instructions to the unmanned vehicle 20. In the unmanned vehicle drive system, the contents of an instruction of the operator are transmitted to a supervising apparatus 40 (not shown) in radio communication, and from the supervising apparatus 40, a travel command is given to the unmanned vehicle 20 in radio communication. By the operator operating a particular switch or button provided in the inside of the driver's cab of the loading machine 30, an instruction (electrical signal) in correspondence with the operation of the operator is converted into a radio signal for use in radio communication, which can be transmitted to the supervising apparatus 40, using a communication device provided for the loading machine 30.

a) Instruction of Position Setting of Loading Point 12

The loading point 12 is successively varied with the loading machine 30 being traveled and moved, or with the working machine 30C being slewed and stopped to be repositioned.

Position setting of the loading point 12 is instructed by the operator making an operation to position the bucket mounted to the working machine 30C at a desired point, and the operator depressing a "spot button" provided in the inside of the driver's cab of the working machine 30C. Once position setting of the loading point 12 is instructed, the supervising apparatus 40 uses the bucket position of the working machine 30C as the position of the loading point 12 for generating a travel route 10 to lead the unmanned vehicle 20 to the loading point 12.

b) Instruction of Approach to Loading Point 12

While the unmanned vehicle 20 is stopped at the waiting point 14 as described above, it cannot travel through an interval from the waiting point 14 to the loading point 12, unless there is given an instruction of approach to the loading point 12. The travel route from the waiting point 14 to the loading point 12 is referred to as the "final approach 16". An instruction of approach to the loading point 12 is given to the unmanned vehicle 20 with the operator depressing a "come-in button" provided in the driver's cab of the loading machine 30. On the basis of an electrical signal generated with the "come-in button" being depressed, the communication device loaded in the loading machine 30 transmits a radio signal (a signal giving the instruction of approach) to the unmanned vehicle 20, and the unmanned vehicle 20 receives that radio signal by the communication device loaded in the unmanned vehicle 20. In this way, when the unmanned vehicle 20 receives the instruction of approach to the loading point 12, the unmanned vehicle 20 is traveled from the waiting point 14 to the loading point 12 along the final approach 16.

c) Instruction of Withdrawal from Loading Point 12

Once the loading operation has been completed, in order to allow making an operation of loading a load onto the unmanned vehicle 20 which would subsequently approach to the loading site 1, it is necessary to cause the unmanned vehicle 20 currently positioned at the loading point 12 to withdraw from the loading point 12. Withdrawal from the loading point 12 is instructed by the operator depressing a "go-button" provided in the inside of the driver's cab of the loading machine 30. When the unmanned vehicle 20 receives an instruction of withdrawal from the loading point 12, the unmanned vehicle 20 leaves from the loading point 12 to be traveled toward the exit point 15 of the loading site 1. This instruction of withdrawal of the unmanned vehicle 20 is also executed by radio communication between the loading machine 30 and the unmanned vehicle 20 as is the case with the instruction of approach as described above.

Hereafter, to the unmanned vehicle 20 which would subsequently approach to the loading site 1, the same processing is performed. So long as the loading point 12 is not varied, and the travel route 10 is not varied, due to a movement of the loading machine 30, or the like, the operator of the loading machine 30 need not operate the "spot button", and by simply repeating the button operation of the "come-in button" and the "go-button", the operator can continuously perform a loading operation on the respective unmanned vehicles 20.

However, with the single-side loading, the waiting time of the unmanned vehicle 20 which would subsequently go over to the loading point 12 is increased, thereby the productivity being lowered. Then, the "both-side loading" is widely accepted, because it involves less waiting time of the unmanned vehicle 20 which would go over to the loading point 12, thereby allowing improvement in productivity to be expected.

(Both-Side Loading)

FIG. 1 illustrates a case where both-side loading is performed in the loading site 1. In both-side loading, a left loading point 12L (left loading) and a right loading point 12R (right loading) are set for the loading point 12. The travel route 10 in the case of both-side loading is defined like the travel route 10 in the case of single-side loading. However, when it is necessary to discriminate between "left" and "right" for the travel route 10, the loading point 12, the final approach 16, and the exit course 17, the letters "L" and "R" will be provided after the respective numerical references, for convenience of explanation.

The left loading point 12L is a loading point where the direction of approach of the unmanned vehicle 20 to the loading machine 30 is leftward, while the right loading point 12R is a loading point where the direction of approach of the unmanned vehicle 20 to the loading machine 30 is rightward. The both-side loading is a loading operation in which the unmanned vehicle 20 is caused to approach to any of the left and right side of the loading machine 30, and therefore the loading is performed more continuously, resulting in the waiting time of the unmanned vehicle 20 being reduced, and thus the productivity being increased.

In the both-side loading, the operator gives the following instructions to the unmanned vehicle 20 of the loading machine 30. The contents of the instruction of the operator are transmitted to the supervising apparatus 40 (not shown) in a radio signal, and from the supervising apparatus 40, are given to the unmanned vehicle 20 as a travel command in a radio signal.

a) Instruction of Position Setting of Left Loading Point 12L or Right Loading Point 12R

In the inside of the driver's cab of the loading machine 30, there are provided a "left-right instruction button" for instructing the left loading point 12L (left loading) or the right loading point 12R (right loading). The "left-right instruction button" may be separately provided as that for left instruction and that for right instruction, or may be a single toggle switch which allows either of the left and right instructions to be given. The operator operates the operation lever to operate the upper slewing structure 30B or the working machine 30C such that the bucket of the working machine 30C is positioned at a desired loading point. Thereafter, the operator depresses the "left-right instruction button" to select the side on which the loading point 12 of the unmanned vehicle 20 is to be set (the side on which the travel route 10 is to be generated). Further, in order to define the bucket of the working machine 30C as the position of the loading point, the operator depresses the "spot button" for instructing position setting of the loading point 12. Assuming that, for example, the "left loading" has been instructed by use of the "left-right instruction button", the bucket position of the working machine 30C at the time when the "spot button" has been depressed is set as the position of the left loading point 12L. And, a new travel route 10L leading to the set left loading point 12L is generated by the supervising apparatus 40.

b) Instruction of Approach to Left Loading Point 12L or Right Loading Point 12R

The operator depresses the "left-right instruction button" to select the side on which there exists the loading point 12 which is to be approached. Further, the operator depresses the "come-in button" to instruct approach to the loading point 12 on that selected side. Assuming that, for example, the "left loading" has been instructed by use of the "left-right instruction button", a travel command is given to the unmanned vehicle 20 which exists on the travel route 10L leading to the "left loading point 12L", and the unmanned vehicle 20 is traveled from the waiting point 14 to the left loading point 12L through the final approach 16L.

c) Instruction of Withdrawal from Left Loading Point 12L or Right Loading Point 12R

The operator of the loading machine 30 depresses the "left-right instruction button" to select the side on which there exists the loading point 12 from which the unmanned vehicle 20 is to withdraw. Further, the operator depresses the "go-button" to instruct withdrawal of the unmanned vehicle 20 from the loading point 12 on that selected side. Assuming that, for example, the "left loading" has been instructed, a travel command is given to the unmanned vehicle 20 which exists at the "left loading point 12L", and the unmanned vehicle 20 leaves the left loading point 12L to be traveled toward the exit point 15 of the loading site 1 through the exit course 17L.

In the patent document 1, there is disclosed an invention with which, every time the loading machine is moved, the position of the loading point is automatically found, and a travel route allowing the unmanned vehicle to travel to that loading point is generated.

Patent document: Japanese Patent Application Laid-open No. H08-263138

DISCLOSURE OF THE INVENTION

Problems to be Solved by the Invention

The both-side loading, which is one form of operation of loading a load onto the unmanned vehicle 20 by means of the loading machine 30, finding application in mines, and the like, allows improvement in productivity, as compared to the single-side loading.

However, in the both-side loading, a) when the operator of the loading machine 30 gives a travel command (an approach command or a withdrawal command) to the unmanned vehicle 20, the operator must always judge "left" or "right" with respect to the loading machine 30, and instruct "left" or "right", and that judgment of left or right and the operation of the left-right instruction button have become troublesome. In other words, when the operator of the loading machine 30 gives a travel command to the unmanned vehicle 20, the operator must judge whether the loading position of the unmanned vehicle 20 to which the travel command is to be given is left or right with respect to the loading machine 30, and depress the "left-right instruction button", which has become a factor of lowering the workability of the operator. With the loading machine 30, or the like, provided with a slewing upper structure which makes a slewing operation, the operator must make a judgment of "left" or "right", discriminating from the landscape outside the driver's seat after the slewing operation.

b) every time the operator of the loading machine 30 sets the position of the loading point 12, the operator always must judge "left" or "right", and instruct "left" of "right", and that judgment of left or right and the operation of the left-right instruction button have become troublesome. In other words, every time the operator sets the position of the loading point 12, the operator must judge left or right, and depress the "left-right instruction button", which has become a factor of lowering the workability of the operator. Again, with the loading machine 30, or the like, provided with a slewing upper structure which makes a slewing operation, the operator must make a judgment of "left" or "right", discriminating from the landscape outside the driver's seat after the slewing operation.

The present invention has been made in view of such a situation, and it is a first object of the present invention to eliminate the need for making a judgment of left or right and making an operation by use of a left-right instruction button in giving a travel command to an unmanned vehicle in both-side loading, thereby improving the operator's workability.

Also, it is a second object of the present invention to eliminate the need for making a judgment of left or right and making an operation by use of a left-right instruction button in setting the position of the loading point in both-side loading, thereby improving the workability.

By the way, the patent document 1 does not presuppose both-side loading, and does not utterly mention the above-described problems in both-side loading.

Means for Solving the Problems

The first invention is an unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine performs loading onto the unmanned vehicle is leftward or rightward with respect to the loading machine, characterized by comprising:

boundary line generation means for, on the basis of information about the direction of approach to the left or right loading point of the unmanned vehicle, generating a boundary line for discriminating whether the working machine of the loading machine has been positioned on the side of the left loading point or positioned on the side of the right loading point;

detection means for detecting the orientation or position of the working machine of the loading machine;

discrimination means for, in correlation between the orientation or position of the working machine that has been detected by the detection means and the direction or position of the boundary line, discriminating whether the working machine of the loading machine has been positioned on the side of the left loading point or positioned on the side of the right loading point;

travel command instruction means for instructing a travel command; and travel control means for, when a travel command is instructed by the travel command instruction means, giving a travel command to the unmanned vehicle which is to perform loading at the loading point on the side which has been determined through the discrimination means.

The second invention is an unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine in a loading site performs loading onto the unmanned vehicle is leftward or rightward with respect to the loading machine, characterized by comprising:

boundary line generation means for, on the basis of information about the features of the loading site, generating a boundary line for discriminating whether the working machine of the loading machine has been positioned on the side of the left loading point or positioned on the side of the right loading point;

detection means for detecting the orientation or position of the working machine of the loading machine;

discrimination means for, in correlation between the orientation or position of the working machine that has been detected by the detection means and the direction or position of the boundary line, discriminating whether the working machine of the loading machine has been positioned on the side of the left loading point or positioned on the side of the right loading point;

travel command instruction means for instructing a travel command; and travel control means for, when a travel command is instructed by the travel command instruction means, giving a travel command to the unmanned vehicle which is to perform loading at the loading point on the side which has been determined through the discrimination means.

The third invention is a drive control method for an unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine performs loading onto the unmanned vehicle is leftward or rightward with respect to the loading machine, characterized by comprising:

a boundary line generation step of generating a boundary line for discriminating whether the working machine of the loading machine has been positioned on the side of the left loading point or positioned on the side of the right loading point;

a travel command instruction step of instructing a travel command;

a discrimination step of, in correlation between the orientation or position of the working machine when the travel command is instructed and the direction or position of the boundary line, discriminating whether the working machine of the loading machine has been positioned on the side of the left loading point or positioned on the side of the right loading point; and a travel control step of giving a travel command to the unmanned vehicle which is to perform loading at the loading point on the side which has been determined The fourth invention is characterized in that, in the first, second or third invention, the travel command is a travel command for causing the unmanned vehicle to approach to the loading point or for causing the unmanned vehicle to withdraw from the loading point.

The fifth invention is an unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine performs loading onto the unmanned vehicle is leftward or rightward with respect to the loading machine, characterized by comprising:

boundary line generation means for, on the basis of information about the direction of approach to the left or right loading point of the unmanned vehicle, generating a boundary line for discriminating whether the working machine of the loading machine has been positioned on the side of the left loading point or positioned on the side of the right loading point;

detection means for detecting the orientation or position of the working machine of the loading machine;

discrimination means for, in correlation between the orientation or position of the working machine that has been detected by the detection means and the direction or position of the boundary line, discriminating whether the working machine of the loading machine has been positioned on the side of the left loading point or positioned on the side of the right loading point;

loading point position setting instruction means for defining the position of the loading point to instruct position setting of the loading point; and travel command generation means for, when the loading point position setting instruction means instructs position setting of the loading point, setting the position of the loading point on the side which has been determined through the discrimination means, as the defined position, and generate a travel route to the loading point.

The sixth invention is an unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine in a loading site performs loading onto the unmanned vehicle is leftward or rightward with respect to the loading machine, characterized by comprising:

boundary line generation means for generating, on the basis of information about the features of the loading site, a boundary line for discriminating whether the working machine of the loading machine has been positioned on the side of the left loading point or positioned on the side of the right loading point;

detection means for detecting the orientation or position of the working machine of the loading machine;

discrimination means for, in correlation between the orientation or position of the working machine that has been detected by the detection means and the direction or position of the boundary line, discriminating whether the working machine of the loading machine has been positioned on the side of the left loading point or positioned on the side of the right loading point;

loading point position setting instruction means for defining the position of the loading point to instruct position setting of the loading point; and travel command generation means for, when the loading point position setting instruction means instructs position setting of the loading point, setting the position of the loading point on the side which has been determined through the discrimination means, as the defined position, and generate a travel route to the loading point.

The seventh invention is characterized in that, in the fifth or sixth invention, every time the position of the loading point is altered, the boundary line is re-generated.

The eighth invention is a drive control method for unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine performs loading onto the unmanned vehicle is leftward or rightward with respect to the loading machine, characterized by comprising:

a boundary line generation step of generating a boundary line for discriminating whether the working machine of the loading machine has been positioned on the side of the left loading point or positioned on the side of the right loading point;

a loading point position setting instruction step of defining the position of the loading point to instruct position setting of the loading point;

a discrimination step of, in correlation between the orientation or position of the working machine when position setting of the loading point is instructed and the direction or position of the boundary line, discriminating whether the working machine of the loading machine has been positioned on the side of the left loading point or positioned on the side of the right loading point; and a travel command generation step of setting the position of the loading point on the side which has been determined, as the defined position, and generating a travel route to the set loading point.

The ninth invention is characterized in that, in the eighth invention, every time the loading point is altered, the boundary line is re-generated.

Effects of the Invention

The first to fourth inventions can achieve the first object; with them, in giving a travel command to an unmanned vehicle in both-side loading, whether the working machine of the loading machine is positioned on the left loading point side, or positioned on the right loading point side is discriminated in correlation between the orientation or position of the working machine of the loading machine at the time when the travel command has been instructed to the unmanned vehicle, and the direction or position of the boundary line, thereby the need for judgment of left or right or operation of the left-right instruction button by the operator is eliminated, resulting in a substantially improved workability.

The fifth to ninth inventions achieve the second object; with them, in setting the position of the loading point in both-side loading, whether the working machine of the loading machine is positioned on the left loading point side, or positioned on the right loading point side is discriminated in correlation between the orientation or position of the working machine of the loading machine at the time when position setting of the loading point has been instructed, and the direction or position of the boundary line, thereby the need for judgment of left or right or operation of the left-right instruction button by the operator is eliminated, resulting in a substantially improved workability.

BEST MODE FOR CARRYING OUT THE INVENTION

First Embodiment

Hereinbelow, with reference to the drawings, an embodiment of a drive system for unmanned vehicle and a drive control method for the same according to the present invention will be explained. In the present embodiment, as a vehicle, an unmanned off-road dump truck (in the present specification, to be referred to as an unmanned vehicle) is assumed. Further, as a loading machine, a manned shovel (for example, a hydraulic excavator) is assumed. The present invention is, of course, applicable not only to shovels, but also to other types of loading machines, such as backhoes, excavators, wheel loaders, and the like.

FIG. 1 is a drawing of a loading site 1, when viewed from the top.

The wide-area working site of quarries, mines, and the like, has particular areas, such as a loading site, an earth removing site, a filling station, and a machinery parking lot. These particular areas are mutually jointed by a maintained transportation road, called a haul road, sidetracks extending from the haul road to the particular areas, called access roads, and junctions.

The loading site, which is one of the particular areas, is a site where an operation of loading earth and sand onto an unmanned vehicle is performed. In the loading site, an excavation work using a loading machine, such as a wheel loader, a backhoe, or a shovel, is performed, and an operation of loading of earth and sand onto an unmanned vehicle is performed.

For example, a loading machine 30 constituted as a shovel has an upper slewing structure 30B which is freely slewable with respect to a base carrier 30A. The base carrier 30A drives a crawler as an endless track for traveling the loading machine 30 or drives tires for traveling the loading machine 30. The loading machine 30 uses a working machine 30C mounted to the upper slewing structure 30B to excavate a working face 1a in the loading site 1. The working machine 30C is equipped with a boom, arm, and bucket, and using a hydraulic cylinder (not shown), operates the boom, arm, and bucket. The working machine 30C may not be of a type which operates the boom, arm, and bucket by extending or retracting the hydraulic cylinder, but may be of a type which operates the boom, arm, and bucket by winding-up or winding-back a wire cable. Or, the working machine 30C may be of a type which, instead of being equipped with an arm, suspends a clamshell bucket from the tip of the boom with a wire. The upper slewing structure 30B is provided with a driver's seat, and by the operator operating an operation lever provided in the inside of the driver's cab, the upper slewing structure 30B can be slewed with respect to the base carrier 30A, and vertical movement of the boom of the working machine 30C, that of the arm thereof, and that of the bucket thereof can be performed. Accordingly, through the operation of the operator, the working machine 30C can be positioned at a loading point 12 (a left loading point 12L or a right loading point 12R) for loading a load onto the unmanned vehicle 20.

The unmanned vehicle 20 is a front wheel steering vehicle which is provided with a driver's cab on the car body front, a load-carrying platform (vessel, body) on the car body rear for loading a load thereon, front wheels and rear wheels. The unmanned vehicle is not limited to that which has such a construction, and may be that which has no driver's cab, or that which the front wheels and the rear wheels are constituted by a crawler as an endless track instead of tires. Further, the unmanned vehicle may be a vehicle, called an articulated dump truck, in which a vehicle front part is mechanically connected with a vehicle rear part having a load-carrying platform.

The unmanned vehicle 20 is subjected to guided traveling along a travel route 10 within the loading site 1 to travel from an entrance point 11 to the loading point 12 (the left loading point 12L or the right loading point 12R), where a manned loading machine 30 exists. In the present specification, in a case where there is no need for discriminating between the left loading point 12L and the right loading point 12R for explanation, these are generically referred to as the "loading point 12".

The entrance point 11 is a point which is previously set, and at which the haul road (not shown) on which the unmanned vehicle 20 travels is crossed with the loading site 1. In addition, on the travel route 10, a waiting point 14 is set as a point where the unmanned vehicle 20 is to wait until there is given a permission of approach by the loading machine 30. For example, as the waiting point 14, a switch-back point 13 is established. The switch-back point 13 is a point where, after having traveled in the forward travel mode, the unmanned vehicle 20 performs a switch-back operation for making an approach to the loading point 12 of the loading machine 30 in the backward travel mode.

In the present specification, for convenience of explanation, the switch-back point 13 is assumed to be the waiting point 14, however, the waiting point 14 is not always limited to the switch-back point 13.

For example, in a case where a shovel provides the loading machine 30, a point on the travel route 10 that is separate from the loading point 12 by a certain distance (a set value) is often set as the waiting point 14. However, when there is the switch-back point 13 at a point closer to the loading point 12, the switch-back point 13 is set as the waiting point 14.

In addition, in a case where a wheel loader provides the loading machine 30, a supposed operational area for the wheel loader is generated on the basis of the position of the loading point 12 and the set size of the wheel loader, and a position where the travel route 10 initially interferes with this supposed operational area between the entrance point 11 and the loading point 12 is often set as the waiting point 14. This is because the wheel loader is moved forward and rearward or leftward or rightward for making a loading operation, and thus possible interference between the unmanned vehicle 20 and the wheel loader must be taken into account. However, in a case where the switch-back point 13 must be provided closer to the entrance point 11, rather than on the aforementioned interfering position, the switch-back point 13 is set as the waiting point 14. In a case where a wheel loader provides the loading machine 30, a travel route on which no switch-back is performed may be generated.

The travel route 10 is a travel route along which the unmanned vehicle 20 is traveled from the entrance point 11 to the loading point 12 through the waiting point 14 in the vicinity of the loading point 12. Within the travel route 10, the travel route extending from the waiting point 14 to the loading point 12 is particularly defined to be a "final approach" 16.

Since the loading machine 30, such as a shovel, makes a move, or the like, to a new excavation site, the loading point 12 is successively varied. The reason why a wording of "a move, or the like" is used is that sometimes the loading machine 30 itself is not moved, but the working machine 30C is slewed, thereby the loading point 12 (the position where a load is loaded onto the unmanned vehicle), which is the bucket position of the working machine 30C, is varied.

The loading point 12 for the loading machine 30 exists in either the leftward or rightward position of the loading machine 30 that has been given by slewing the working machine 30C leftward or rightward with respect to the base carrier 30A, and each loading point is referred to as the left loading point 12L or the right loading point 12R. The left loading point 12L is a loading point for which the direction of approach of the unmanned vehicle 20 with respect to the working machine 30C is a leftward direction, while the right loading point 12R is a loading point for which the direction of approach of the unmanned vehicle 20 with respect to the working machine 30C is a rightward direction. The left or right loading point 12L, 12R corresponds to the position of the bucket of the working machine 30C. The size and the shape of the bucket which is mounted to the working machine 30C are selected in accordance with the automobile rank of the loading machine 30, the type of the load, and the like. Therefore, as the position of the bucket, the center position or equivalent of the mounted bucket that is given in the inside thereof accommodating a load is previously established. Depending upon the shape, or the like, of the bucket, the center position or equivalent is not always established as the bucket position, and the position which makes the loading operation easier to be performed may be optionally established as the bucket position. In addition, the spatial position of the bucket varies depending upon the attitude of the boom or arm constituting the working machine 30C. Then, in a case where the attitude of the working machine 30C at the time when it loads a load onto the unmanned vehicle 30 is taken, the position of the left loading point 12L or the right loading point 12R is calculated from the distance measured from a given position of the upper slewing structure 30B to the center position or equivalent of the bucket in the inside thereof accommodating the load, with the length of the boom or arm of the working machine 30C that is mounted to that working machine 30C being considered. The lengths of the boom and arm, and the center position of the bucket are previously stored in a storage device 34 of the loading machine 30, and the attitude of the working machine 30C is detected with a displacement sensor, or the like, the processing device 32 performing calculation to find the positions (the X-coordinate position, the Y-coordinate position, and the like) of the left loading point 12L or the right loading point 12R. Instead of detecting the attitude of the working machine 30C with the displacement sensor, a fixed value may be stored in the storage device 34 in order to make the operation more convenient, and using that fixed value, calculation to find the loading point may be performed.

In the scheme of both-side loading, as a general rule, two unmanned vehicles 20 are alternately caused to approach to the leftward or rightward position of the loading machine 30 to travel to the left loading point 12L or the right loading point 12R for making a loading operation. Therefore, the loading machine 30 simultaneously holds separate travel routes 10 (10L and 10R) for left and right, and when, for example, the right side loading point 12R has been repositioned, a new travel route 10 (10R) extending to a new right loading point 12R is generated, with the travel route 10 (10L) extending to the left loading point 12L being not altered, and not affected.

The travel route 10 is generated by a later described supervising apparatus 40 on the basis of the positional information about the loading point 12 and the positional information about the entrance point 11. In a case where a plurality of travel routes 10 are generated, the reference numeral "10" will be provided with a dash "'" as appropriate to distinguish between travel routes.

The unmanned vehicle 20 follows the travel route 10 received from the supervising apparatus 40 in radio communication, the unmanned vehicle 20 making engine output control, steering control, and brake control by self-control, while adjusting the travel speed or travel direction, entering the loading site 1 from the entrance point 11, heading for the waiting point 14 (switch-back point 13), performing switch-back at the waiting point 14 (switch-back point 13), and stopping at the loading point 12 to be loaded with a load, such as earth and sand, or the like, onto the load-carrying platform thereof by the working machine 30C of the loading machine 30. After completion of the loading operation, the unmanned vehicle 20 is withdrawn from the loading point 12 to travel toward the exit point 15 also under the self-control.

Before and after the waiting point 14 (switch-back point 13), the travel direction of the unmanned vehicle 20 is changed over from the forward direction to the backward direction. To the loading point 12, the unmanned vehicle 20 approaches in the backward travel mode. Depending upon the geographical features, or the like, of the loading site 1, the travel route 10 may be configured such that the unmanned vehicle 20 does not make a switch-back, and approaches to the loading point 12 in the forward travel mode. Once the loading point 12 is repositioned, a new travel route 10 extending from the entrance point 11 to the loading point 12 in the altered position is generated.

In order to distinguish between the left loading point 12L or the right loading point 12R before and after being repositioned, the reference numeral "12L" or "12R" after being repositioned will be provided with a dash "'" as appropriate.

FIG. 2 is a block diagram of a vehicle drive system of the embodiment. In a case where a plurality of vehicles 20 are traveled in the loading site 1, the reference numeral "20" will be provided with a dash "'" as appropriate in order to distinguish between vehicles.

In the working site, a supervising apparatus 40 for managing or monitoring a number of unmanned vehicles 20, 20', . . . is provided. In the supervising apparatus 40, a communication device 41, a processing device 42, an input device 43, a storage device 44, and a display device 45 are provided. The communication device 41 is constituted by communication equipment (an antenna, a receiver, a transmitter, and the like), such as a wireless LAN, or the like. The processing device 42 is constituted by a CPU, such as a numerical value calculation processor. The input device 43 is constituted by a keyboard and a GUI (graphical user interface), such as a touch panel, which allows numerical values and characters to be input. The storage device 44 is constituted by components for storing various types of information, such as a hard disk, ROM, RAM, memory card, and the like. The display device 45 is constituted by a liquid crystal display, or the like, for displaying various types of information.

On the other hand, in the unmanned vehicle 20, 20', a communication device 21, a processing device 22, a position measuring device 23, a control device 24, and a storage device 25 are provided. The communication device 21 is constituted by communication equipment (an antenna, a receiver, a transmitter, and the like), such as a wireless LAN. The processing device 22 is constituted by a CPU, such as a numerical value calculation processor. The position measuring device 23 is a system constituted by a GPS (global positioning system) sensor, or the like, allowing radio waves from the GPS satellite to receive for measuring the position (longitude/latitude/altitude) of the unmanned vehicle 20. The control device 24 is an electronic controller for performing engine output control, steering control, brake control, and the like, for the unmanned vehicle 20, acceleration/deceleration and stopping of the unmanned vehicle 20, and travel direction control thereof. The storage device 25 is constituted by components for storing various types of information, such as a hard disk, ROM, RAM, memory card, and the like.

The loading machine 30 is provided with a communication device 31, a processing device 32, an input device 33, a storage device 34, a position measuring device 35, a working machine position measuring device 35a, and a display device 36. The communication device 31 is constituted by communication equipment (an antenna, a receiver, a transmitter, and the like), such as a wireless LAN. The processing device 22 is constituted by a CPU, such as a numerical value calculation processor. The input device 33 is constituted by such components as a keyboard and a GUI (graphical user interface), such as a touch panel, which allows numerical values, characters, and the like, to be input, and pushbutton switches to transmit various command signals. The storage device 34 is constituted by components for storing various types of information, such as a hard disk, ROM, RAM, memory card, and the like. The working machine position measuring device 35a measures, from a predetermined position of the loading machine 30 (for example, the position of the center of gravity of the loading machine 30), the position of the bucket of the working machine 30C that is positioned by the operator operating the operation lever. Specifically, the cylinder stroke of the respective hydraulic cylinders for operating the boom or arm, and bucket constituting the working machine 30C is detected by a displacement sensor, and using the respective displacements detected and the position of the center of gravity of the loading machine 30, the spacial coordinates (position coordinates) of the position of the bucket are measured. The size and the shape of the bucket which is mounted to the working machine 30C are selected in accordance with the automobile rank of the loading machine 30, the type of the load, and the like. Therefore, as the position of the bucket, the center position or equivalent of the mounted bucket that is given in the inside thereof accommodating a load is previously established, and from that center position and the states in which the respective hydraulic cylinders are extended or retracted, in other words, the attitudes of the boom, arm, and bucket, the position coordinates of the loading point 12 are found through calculation. Hereinafter, the positional information about the bucket means the position coordinates of the loading point 12. Also in a case where wire cables are connected to the boom, arm, and bucket, and by winding-up or winding-back the wire cables, the attitude of the working machine 30C is established, the use of the displacement detected with a rotary sensor (for example, rotary encoder, or the like) mounted on the wire cable winding-up machine allows calculation and measurement for the working machine position (loading point 12) to be performed in the same manner. The display device 45 is provided in the inside of the driver's cab of the loading machine 30, being constituted by a liquid crystal display, and the like, for displaying various types of information. The liquid crystal display may be a touch panel of resistive film type, or may be a unit performing only the display, the operation buttons being separately provided.

FIG. 3 illustrates the detail of the configuration of the input device 33 of the loading machine 30.

As shown in FIG. 3, the input device 33 is provided in the inside of the driver's cab of the loading machine 30, being constituted by a touch panel. The input device 33 is disposed in a position where the touch panel can be pressed by the operator of the loading machine 30. The input device 33 is configured to include a left-right instruction button 33a, a spot button 33b, a come-in button 33c, a go-button 33d, and a switch side button 33e. In addition, on the display device 36 of the loading machine 30, the boundary line 90, the travel route 10, and the unmanned vehicle 20 are displayed, and while viewing the screen of the display device 36, the operator can perform various operations with the left-right instruction button 33a, the spot button 33b, the come-in button 33c, the go-button 33d, and the switch side button 33e of the input device 33.

The respective buttons may be provided in a predetermined location of the touch panel together with the characters as shown in FIG. 3, or the respective switch buttons may be displayed on the touch panel, using an icon, or any other pattern, such that the operator can discriminate which button provides what function.

Any instruction from the operator of the loading machine 30 is effected by the operator depressing the pertinent switch button of the input device 33. An electrical signal corresponding to the respective switch buttons is converted into a radio signal by the processing device 32, and the radio signal is sent to the supervising apparatus 40 through the communication device 31. Thereafter, from the supervising apparatus 40 to the unmanned vehicle 20, the information about the travel route 10 or the travel command is given in a radio signal. The details of such an exchange of radio signals will be described later. The left-right instruction button 33a, the spot button 33b, the come-in button 33c, the go-button 33d, and the switch side button 33e will be explained here.

Left-Right Instruction Button 33a

The left-right instruction button 33a is a button for instructing that the loading is to be effected at the left loading point 12L (the left loading), or at the right loading point 12R (the right loading). When either of the "left loading" and "right loading" is selected using the left-right instruction button 33a, a left-right instruction signal indicating which of the "left loading" and the "right loading" has been selected is generated, being sent to the supervising apparatus 40. As shown in FIG. 3, the left-right instruction button 33a may be constituted by a single button with the operation method being established which gives the left loading by depressing the button once, and the right loading by continuously depressing it twice, or two left-right instruction buttons 33a may be provided such that one of them instructs the left loading, and the other the right loading.

Spot Button 33b

The spot button 33b is a button for instructing the initial position or the altered position of the loading point 12. The operator of the loading machine 30 operates the operation lever provided in the inside of the driver's cab to operate the upper slewing structure 30B or the base carrier 30A; further, operate the working machine 30C connected to the upper slewing structure 30B; and position the bucket mounted to the working machine 30C to a desired loading point, and then when the operator depresses the spot button 33b of the input device 33, a position instruction signal is generated. A signal giving the positional information about the loading machine 30 and the bucket of the working machine 30C and the position instruction signal are sent from the communication device 31 to the supervising apparatus 40 as radio signals.

Come-in Button 33c

The come-in button 33c is a button for instructing a travel command to cause the unmanned vehicle 20 to approach to the loading point 12. When the operator of the loading machine 30 depresses the come-in button 33c of the input device 33, an approach instruction signal is generated. A signal giving the positional information about the loading machine 30 and the bucket of the working machine 30C and the approach instruction signal are sent from the communication device 31 to the supervising apparatus 40 as radio signals.

Go-Button 33d

The go-button 33d is a button for instructing a travel command to cause the unmanned vehicle 20 to withdraw from the loading point 12. When the operator of the loading machine 30 depresses the go-button 33d of the input device 33, a withdrawal instruction signal is generated. Together with a signal giving the positional information about the loading machine 30 and the positional information about the tip of the bucket of the working machine 30C, the withdrawal instruction signal is sent from the communication device 31 to the supervising apparatus 40.

Switch Side Button 33e

The switch side button 33e is a button for instructing a travel command for the unmanned vehicle 20 on the side opposite to that which is judged with the later described boundary line. When the operator of the loading machine 30 depresses the switch side button 33e of the input device 33, a switch side instruction signal is generated to instruct a travel command to the unmanned vehicle 20 on the side opposite to that on which the working machine 30C of the current loading machine 30 is positioned with respect to the boundary line, the switch side instruction signal being sent from the communication device 31 to the supervising apparatus 40 as radio signals.

The position measuring device 23 of the unmanned vehicle 20 measures the position of its own vehicle. As the position measurement means, a tire rotational speed sensor and a gyroscope provided for the unmanned vehicle 20 is used, for example. On the basis of the output signal of the tire rotational speed sensor and the output signal of the gyroscope, the vehicle position is measured. Further, as described above, by receiving a signal transmitted from the GPS satellite with a GPS antenna, and detecting the signal with a GPS sensor, the position of the unmanned vehicle 20 may be measured. Furthermore, a system which associates the tire rotational speed sensor and the gyroscope with the GPS sensor may be used for measuring the position of the unmanned vehicle 20. The positional information obtained by the unmanned vehicle 20 is processed by the processing device 22, and is transmitted to the supervising apparatus 40 through the communication device 21. In the storage device 25, the coordinate information about the travel route 10, the positional information giving the position coordinates of the entrance point 11, the exit point 15, and the waiting point 14, and the like, transmitted from the supervising apparatus 40 are stored. In addition, in the storage device 25, various parameters related to the engine control, steering control, and brake control in correspondence with the magnitude of the curve of the travel route 10 (the parameters for fuel oil consumption, the parameters for steering angle, the parameters for hydraulic pressure in the hydraulic circuit for the brake, and the like) are stored.

The communication device 41 of the supervising apparatus 40 receives positional information transmitted from a plurality of unmanned vehicles 20, 20', . . . in radio communication. The positional information received is utilized for managing or monitoring the plurality of unmanned vehicles 20, 20' . . . .

When the operator of the loading machine 30 depresses the left-right instruction button 33a of the input device 33, a left-right instruction signal is generated to be input to the processing device 32. The processing device 32 transmits the left-right instruction signal to the communication device 31. The communication device 31 converts the left-right instruction signal into a radio signal for use in radio communication, and transmits it to the supervising apparatus 40.

The position measuring device 35 of the loading machine 30 measures the position of its own loading machine 30 (the center position given as the center of the loading machine 30). As the position of the loading machine 30, the position of the GPS sensor is measured using the same GPS sensor as that for the unmanned vehicle, and the position measuring device 35 calculates the center position of the loading machine 30, which can be found from the installation position of the GPS sensor and the size of the loading machine 30, as the positional information (the geographical positional information within the loading site 1) of the loading machine 30. In the working machine position measuring device 35a, the position of the bucket of the working machine 30C is measured. The working machine position measuring device 35a calculates the bucket position as the positional information (the geographical positional information within the loading site 1) from the results of measurement of the GPS sensor mounted in a certain place of the working machine 30C with the size, length, and attitude of the boom, arm, and bucket of the working machine 30C being taken into account.

By the operator of the loading machine 30 operating the operation lever in the inside of the driver's cab, the bucket of the working machine 30C is positioned at a desired loading point, and when the spot button 33b in the input device 33 is depressed, a position instruction signal is generated, and is input to the processing device 32. The processing device 32 fetches the positional information about the loading machine 30 and the bucket of the working machine 30C which are being measured by the position measuring device 35 and the working machine position measuring device 35a at that point of time, and transmits it to the communication device 31 with the position instruction signal. The communication device 31 converts the position instruction signal and the signal giving the positional information about the loading machine 30 and the bucket of the working machine 30C into radio signals for use in radio communication, and transmit them to the supervising apparatus 40 in radio communication.

When the operator of the loading machine 30 depresses the come-in button 33c of the input device 33, an approach instruction signal is generated, and is input to the processing device 32. The processing device 32 fetches the positional information about the loading machine 30 and the bucket of the working machine 30C which are being measured by the position measuring device 35 and the working machine position measuring device 35a at that point of time, and transmits it together with the approach instruction signal to the communication device 31. The communication device 31 converts the approach instruction signal and the signal giving the positional information about the loading machine 30 and the bucket of the working machine 30C into radio signals for use in radio communication, and transmits them to the supervising apparatus 40 in radio communication.

When the operator of the loading machine 30 depresses the go-button 33d of the input device 33, a withdrawal instruction signal is generated, and is input to the processing device 32. The processing device 32 fetches the positional information about the loading machine 30 and the bucket of the working machine 30C which are being measured by the position measuring device 35 and the working machine position measuring device 35 at that point of time, and transmits it to the communication device 31 together with the withdrawal instruction signal. The communication device 31 converts the withdrawal instruction signal and the signal giving the positional information about the loading machine 30 and the bucket of the working machine 30C into radio signals for use in radio communication, and transmits them to the supervising apparatus 40 in radio communication.

When the operator of the loading machine 30 depresses the switch side button 33e of the input device 33, a switch side instruction signal is generated, and is input to the processing device 32. The processing device 32 transmits the switch side instruction signal to the communication device 31. The communication device 31 converts the switch side instruction signal into a radio signal for use in radio communication, and transmits it to the supervising apparatus 40 in radio communication.

The communication device 41 of the supervising apparatus 40 receives various signals (radio signals) transmitted from the loading machine 30.

To the input device 43 of the supervising apparatus 40, the known geographical information about the loading site 1, such as the position and direction of the entrance point 11 of the loading site 1 where the loading machine 30 is to perform excavation, is input.

The processing device 42 of the supervising apparatus 40 fetches the signals received by the communication device 41 and the information input to the input device 43, and executes generation processing of the later described boundary line, generation processing of the travel route 10, and generation processing of a travel command.

The generated information about the boundary line and the travel route 10, and the positional information about the unmanned vehicle 20 are transmitted to the loading machine 30 through the communication device 41 of the supervising apparatus 40. In addition, the information about the travel route 10 and the travel command are transmitted to the unmanned vehicle 20 through the communication device 41 of the supervising apparatus 40.

The communication device 31 of the loading machine 30 receives the information about the boundary line and the travel route 10, and the positional information about the unmanned vehicle 20 from the supervising apparatus 40. The processing device 32 of the loading machine 30 fetches the information about the boundary line and the travel route 10, and the positional information about the unmanned vehicle 20, and graphically displays the boundary line, the travel route 10, and the positions of the unmanned vehicle 20 and the loading machine 30 itself on the display device 36 of the loading machine 30 together with a geographical figure of the loading site 1.

The communication device 21 of the unmanned vehicle 20 receives the information about the travel command and the travel route 10 transmitted from the supervising apparatus 40. The storage device 25 stores the information about the travel route 10 and the travel command transmitted from the supervising apparatus 40.

The processing device 22 of the unmanned vehicle 20 generates a control command for traveling and steering its own unmanned vehicle 20 on the basis of the information about the travel route 10 and the travel command. This control command is output to the control device 24. As a result of this, the control device 24 controls the travel speed and steering angle (steerage) or the brake of its own unmanned vehicle 20, and the unmanned vehicle 20 travels along the travel route 10.

Hereinbelow, explanation will be made with reference to flowcharts as given in FIGS. 4A to 4D.

FIGS. 4A, 4B, 4C and 4D are flowcharts illustrating the procedure for the processing which is performed in the drive system or by the drive control method of the present embodiment.

The flow of the boundary line generation processing is shown in FIGS. 4A and 4B, and the details of the boundary line generation processing will be explained also with reference to FIG. 5.

First, the operator of the loading machine 30 defines the position of the loading point 12 on one side of its own loading machine 30, for example, the left side, and instructs position setting of the left loading point 12L. In other words, the operator is aware of the left side, operating the operation lever in the inside of the driver's cab for slewing the upper slewing structure 30B, and operating the boom, arm, and bucket of the working machine 30C to position the bucket at a desired left loading point 12L. Thereafter, the operator depresses the left-right instruction button 33a of the input device 33 to select and instruct the "left loading" (step 101), and depresses the spot button 33b (step 102). The loading machine 30 transmits a left instruction signal instructing the "left loading" and a position instruction signal instructing the position thereof to the supervising apparatus 40 through the communication device 31.

The processing device 42 of the supervising apparatus 40 fetches the left instruction signal and the position instruction signal which have been sent from the loading machine 30 through the communication device 41. And, the processing device 42 associates the left instruction signal with the position instruction signal, and judges that setting of the position of the "left loading point 12L" has been instructed. And, the processing device 42 sets the working machine (bucket) position Q (see FIG. 5) sent from the loading machine 30 as the position of the "left loading point 12L" (step 103).

Next, the processing device 42 generates a travel route 10L for causing the unmanned vehicle 20 to travel to the left loading point 12L thus set. With the position of the loading machine 30, the position of the unmanned vehicle 20, and another travel route 10R being taken into account, an optimum travel route 10L which is free from occurrence of interference between unmanned vehicles 20 and that of interference of the unmanned vehicle 20 with the loading machine 30 is generated. With the travel route 10L being generated, a vector v1 indicating the direction in which the unmanned vehicle 20 approaches to the left loading point 12L is obtained. However, the orientation of the vector v1 is exactly reverse to the direction in which the unmanned vehicle 20 approaches to the left loading point 12L in the backward travel mode (step 104).

Next, the operator of the loading machine 30 makes an operation for instructing the loading point 12R, which is on the side opposite to the slewing position at step 101 (where the position of the bucket of the working machine 30C is Q as shown in FIG. 5). In other words, the operator defines the position of the loading point 12R on the right side of its own loading machine 30 for instructing position setting of the right loading point 12R. The operator is aware of the right side, operating the operation lever in the inside of the driver's cab for slewing the upper slewing structure 30B, and operating the boom, arm, and bucket of the working machine 30C to position the bucket at a desired right loading point 12R. Thereafter, the operator depresses the spot button 33b of the input device 33 (step 105).

The processing device 42 of the supervising apparatus 40 fetches the position instruction signal sent from the loading machine 30. Since the position setting of the "left loading point 12L" has already been made, a position instruction signal has been transmitted for the second time with the operation of the spot button 33b made by the operator for the right loading point 12R. Accordingly, using the reception of a position instruction signal for a second time as the ground of judgment, the processing device 42 judges that setting the position of the "right loading point 12R" on the side opposite to the "left loading point 12L" has been instructed. And, the processing device 42 sets the working machine (bucket) position Q' transmitted from the loading machine 30 as the position of the "right loading point 12R" (step 106). As shown in FIG. 5, in a case where the travel route 10 for the single side (left side) of the loading machine 30 alone has already been generated, a vector vc which is parallel to the vector v1 thereof, and passes through the center position P of the loading machine 42 is found by the processing device 42 of the loading machine 30. The processing device 42 performs a judgment of whether the loading point indicated by the aforementioned second position instruction signal is positioned truly on the reverse side with respect to the loading point which has been set by the initial position instruction signal. The judgment is performed using the orientation of the vector vc and the positional information about the loading point indicated by the second position instruction signal. If, on the assumption that the direction indicated by the vector vc is zero degrees (the reference), the positional information about the loading point indicated by the second position instruction signal exists in the area of 180-deg in a counterclockwise direction shown with oblique lines in FIG. 5, it is judged that the loading point instructed by the second position instruction signal is on the side opposite to the loading point set by the initial position instruction signal (on the right side). Additionally speaking, if, on the assumption that the direction indicated by the vector vc is zero degrees (the reference), the positional information about the loading point indicated by the second position instruction signal exists in the area of 180-deg in a clockwise direction, it is judged that it is not on the side opposite to the loading point set by the initial position instruction signal (is not on the right side).

Next, the processing device 42 generates a travel route 10R for causing the unmanned vehicle 20 to travel to the right loading point 12R thus set. With the position of the loading machine 30, the position of the unmanned vehicle 20, and another travel route 10L being taken into account, an optimum travel route 10R which is free from occurrence of interference between unmanned vehicles 20 and that of interference of the unmanned vehicle 20 with the loading machine 30 is generated. With the travel route 10R being generated, a vector v2 indicating the direction in which the unmanned vehicle 20 approaches to the right loading point 12R is obtained. However, the orientation of the vector v2 is exactly reverse to the direction in which the unmanned vehicle 20 approaches to the right loading point 12R in the backward travel mode (step 107). Herein, the travel route 10L, 10R refers to the travel route extending from the waiting point 14 to the left or right loading point 12L, 12R.

Next, the processing device 42 of the supervising apparatus 40 performs processing to generate a boundary line 90 on the basis of the information about the direction of approach of the unmanned vehicle 20 to the left or right loading point 12L, 12R, i.e., the vector v1, v2. The boundary line 90 provides a vector line for discriminating whether the working machine 30C of the loading machine 30 is positioned on the side of the left loading point 12L or is positioned on the side of the right loading point 12R.

Specifically, as given by the following equation:

$$v3=(v1+v2)/2 \qquad (1)$$

half of the sum of the vectors v1 and v2 indicating the direction in which the unmanned vehicle 20 approaches to the left or right loading point 12L, 12R, respectively, provides the vector v3 indicating the direction of the boundary line 90. The boundary line 90 is obtained as a line segment which passes through the position of the loading machine 30 (the center position P), having a direction expressed by the vector v3 (step 108). The center position P provides the positional information about the slewing center of the upper slewing structure 30B of the loading machine 30. The center position P may be that which is found in the following manner. The center position P is found from the size (width and overall length) of the loading machine 30, the size of the loading machine 30 being previously stored in the storage device 44 of the supervising apparatus 40. And, the processing device of the supervising apparatus 40 performs the processing of obtaining geographical positional information about the center position P as the starting point of the vector v3, using the geographical positional information measured by the position measuring device 35 of the loading machine 30.

The flow of processing to give a travel command to the unmanned vehicle 20 is illustrated in FIG. 4C and will be explained also with reference to FIG. 6.

(Instruction of Travel Command for Causing Unmanned Vehicle to Approach to Loading Point)

In a case where the operator permits the unmanned vehicle 20 to approach to the loading point 12 for starting the loading operation of the loading machine 30, the operator operates the operation lever in the inside of the driver's cab to slew the upper slewing structure 30B to the side on which the loading operation is to be started. In this case, the operator need not be particularly aware of the "left side" of the "right side", and also need not instruct the "left loading" or the "right loading" by means of the left-right instruction button 33a. And, the operator causes the working machine 30C to be positioned on the side on which the loading operation is to be performed, and depresses the come-in button 33c of the input device 33 (step 109).

(Discrimination of Left-Right Loading Point)

The processing device 42 of the supervising apparatus 40 receives the approach instruction signal transmitted by the loading machine 30 through the communication device 41. Thereby, the supervising apparatus 40 judges that an approach of the unmanned vehicle 20 to the loading point 12 has been instructed.

Next, to which of the left and right loading points 12L and 12R an approach has been instructed is discriminated.

First, the processing device 42 of the supervising apparatus 40 calculates the vector v4 indicating the orientation of the working machine 30C from the geographical positional information about the position P of the loading machine 30 and the position Q of the bucket of the working machine 30C that has been sent together with the approach instruction signal. The vector v4 provides a vector indicating the orientation from the body center position P of the loading machine 30 toward the position Q of the bucket of the working machine 30C.

Next, the processing device 42 of the supervising apparatus 40 correlates the vector v4 thus obtained indicating the orientation of the working machine 30C with the vector v3 indicating the direction of the boundary line 90 to discriminate whether the working machine 30C of the loading machine 30 has been positioned on the side of the left loading point 12L, or positioned on the side of the right loading point 12R.

Specifically, when the z-component of the outer product of the vector v3 and the vector v4, i.e., v3×v4, is positive or negative, it is determined that the working machine 30C of the loading machine 30 has been positioned on the side of the right loading point 12R or positioned on the side of the left loading point 12L, respectively. In other words, since the result of calculation of the outer product is a vector, examination of whether the z-component of the vector as a result of the calculation is positive or negative allows the positional (orientational) relationship between the vector v3 and the vector v4 to be found. Accordingly, it can be found whether the working machine 30C is positioned at the left loading point 12L or positioned at the right loading point 12R.

Whether the working machine 30C of the loading machine 30 has been positioned on the side of the left loading point 12L or has been positioned on the side of the right loading point 12R may be discriminated in correlation between the position of the working machine 30C (the position coordinates of the bucket position Q of the line segment PQ from the loading machine center position P to the bucket position Q of the working machine 30C) and the position of the boundary line 90 (the position coordinates indicated by the line segment which passes the center position P of the loading machine 30), having a direction expressed by the vector v3. In FIG. 6, since the z-component of the outer product between the vector v3 and the vector v4, i.e., v3×v4, is positive, the processing device 42 of the supervising apparatus 40 determines that the working machine 30C of the loading machine 30 has been positioned on the side of the right loading point 12R, and judges that a travel command for causing the unmanned vehicle 20 to approach to the right loading point 12R has been instructed (step 110).

(Travel Control)

In the processing device 42 of the supervising apparatus 40, for the unmanned vehicle 20 which is positioned at the waiting point 14 on the travel route 10R for the unmannded vehicle to be traveled to the loading point 12 on the side determined at step 110, for example, the right loading point 12R, a travel command for causing the unmanned vehicle 20 to approach to the right loading point 12R (a travel route for the final approach 16R) is generated. The travel command (the travel route for the final approach 16R) generated is transmitted from the communication device 41 of the supervising apparatus 40 to the unmanned vehicle 20 together with the information about the travel route 10.

When the unmanned vehicle 20 receives a travel command and the information about the travel route 10R by the communication device 21, the processing device 22 performs generation of a control signal for the control device 24. The control device 24 performs travel speed control, steering angle control, and brake control, while putting the unmanned vehicle 20 under the travel control from the waiting point 14 to the right loading point 12R along the final approach 16R (step 111).

In the above explanation of the steps 109 to 111, a case of instructing a travel command for causing the unmanned vehicle 30 to approach to the loading point 12 has been assumed, however, also in a case of instructing a travel command for causing the unmanned vehicle 30 to withdraw from the loading point 12, the same radio communication, signal processing, and travel control are performed.

(Instruction of Travel Command for Causing Unmanned Vehicle to Withdraw from Loading Point)

Using FIG. 7, instruction of a travel command for causing the unmanned vehicle to withdraw from the loading point will be explained.

In a case where the operator permits the unmanned vehicle 20 to be withdrawn from the loading point 12 after completion of the operation of loading a load on the unmanned vehicle 20 by use of the loading machine 30, the operator depresses the go-button 33d of the input device 33 with the working machine 30C being positioned on the loading side at the time of terminating the loading operation. In this case, the operator need not be particularly aware of the "left side" of the "right side", and also need not instruct the "left loading" or the "right loading" by means of the left-right instruction button 33a (step 109).

(Discrimination of Left-Right Loading Point)

The processing device 42 of the supervising apparatus 40 receives the withdrawal instruction signal sent from the loading machine 30 through the communication device 41. The processing device 42 judges that there has been given an instruction for causing the unmanned vehicle 20 to withdraw from the loading point 12.

Next, the processing device 42 finds the direction of the working machine 30C (the direction of the vector v4) on the basis of the position P of the loading machine 30 and the position Q of the bucket of the working machine 30C which have been sent together with the withdrawal instruction signal, and in correlation between this direction of the working machine 30C (the direction of the vector v4) and the direction of the boundary line 90 (the direction of the vector v3), discriminates which of the left and right loading points 12L and 12R the working machine 30C is positioned at.

In the case illustrated in FIG. 7, since the z-component of the outer product between the vector v3 and the vector v4, i.e., v3×v4, is positive, the processing device 42 determines that the working machine 30C of the loading machine 30 has been positioned on the side of the right loading point 12R, and judges that there has been instructed a travel command for causing the unmanned vehicle 20 to withdraw from the right loading point 12R (step 110).

(Travel Control)

For the unmanned vehicle 20 which exists at the loading point 12 on the side which has been determined at step 110, for example, at the right loading point 12R, the processing device 42 of the supervising apparatus 40 generates a travel command (signal) for causing it to withdraw from the right loading point 12R. The travel command generated is transmitted to the unmanned vehicle 20 through the communication device 41 together with the information about the exit course 17R corresponding to the travel route 10R. If the information about the exit course 17R corresponding to the travel route 10R has already been sent to the unmanned vehicle 20, and there is no change of the exit course 17R corresponding to the travel route 10R, the information about the exit course 17R corresponding to the travel route 10R need not be newly transmitted.

When the unmanned vehicle 20 receives a travel command and the information about the exit course 17R corresponding to the travel route 10R through the communication device 31, it is withdrawn from the right loading point 12L and is traveled along the exit course 17R toward the exit point 15 under the travel control as stated above (step 111).

In the above explanation of the steps 109 to 111, a case of instructing a travel command for the unmanned vehicle 20 on the side determined in correlation with the boundary line 90 has been assumed, however, by operating the switch side button 33e, a practice of instructing a travel command for the unmanned vehicle 20 on the side opposite to that determined in correlation with the boundary line 90 can be made.

(Instruction of Travel Command for Causing Unmanned Vehicle on the Opposite Side to Approach to Loading Point)

Using FIG. 8, instruction of a travel command for causing the unmanned vehicle on the opposite side to approach to the loading point will be explained.

Sometimes it is desirable that, while the loading machine 30 is performing a loading operation on the unmanned vehicle 20 at the loading point 12 on one side, another unmanned vehicle 20' be permitted to approach to the loading point 12 on the opposite side for increasing the productivity. In this case, the operator of the loading machine 30 operates the switch side button 33c of the input device 33 in order to provide the unmanned vehicle 20' with a permission to approach to the loading point 12 on the side opposite to that on which the working machine 30C is currently positioned. For example, when the loading machine 30 is performing a loading operation at the right loading point 12R, the operator depresses the switch side button 33e of the input device 33 with the working machine 30C being positioned at the right loading point 12R, and depresses the come-in button 33c. Also in this case, the operator need not be particularly aware of the "left side" or the "right side", and also need not instruct the "left loading" or the "right loading" by means of the left-right instruction button 33a (step 109).

(Discrimination of Left-Right Loading Point)

The processing device 42 of the supervising apparatus 40 receives the approach instruction signal transmitted from the loading machine 30 through the communication device 41. Thereby, the processing device 42 judges that the unmanned vehicle 20 has been instructed to approach to the loading point 12. In addition, the processing device 42 of the supervising apparatus 40 receives the switch side instruction signal transmitted from the loading machine 30 through the communication device 41. The processing device 42 judges that there has been given a travel command for causing the unmanned vehicle 20' to approach to the loading point 12 on the side opposite to that determined in correlation with the boundary line 90.

Next, the processing device 42 finds the direction of the working machine 30C (the direction of the vector v4) on the basis of the position P of the loading machine 30 and the position Q of the bucket of the working machine 30C which have been received together with the approach instruction signal through the communication device 41, and in correlation between this direction of the working machine 30C (the direction of the vector v4) and the direction of the boundary line 90 (the direction of the vector v3), discriminates which of the left and right loading points 12L and 12R the working machine 30C is positioned at.

In FIG. 8, since the z-component of the outer product between the vector v3 and the vector v4, i.e., v3×v4, is positive, the processing device 42 of the supervising apparatus 40 determines that the working machine 30C of the loading machine 30 has been positioned on the side of the right loading point 12R. Herein, since, to the processing device 42, a switch side instruction signal has been transmitted through the communication device 41, the processing device 42 judges that there has been instructed a travel command for causing the unmanned vehicle 20' to approach to the left loading point 12L, which is on the side opposite to the right loading point 12R (step 110).

(Travel Control)

For the unmanned vehicle 20' which is positioned at the waiting point 14 on the travel route 10L in order to be traveled to the loading point 12 on the side determined at step 110, for example, the left loading point 12L, the processing device 42 of the supervising apparatus 40 generates a travel command for causing the unmanned vehicle 20' to approach to the left loading point 12L. The travel command generated is transmitted to the unmanned vehicle 20' through the communication device 41 together with the information about the travel route 10L.

When the unmanned vehicle 20' receives a travel command and the information about the travel route 10L through the communication device 31, the unmanned vehicle 20' is traveled from the waiting point 14 to the left loading point 12L through the final approach 16L under the travel control as stated above (step 111).

Also in a case where a travel command for causing the unmanned vehicle 20' on the opposite side to withdraw from the loading point 12, the processing as described above is performed. For example, with the working machine 30C being positioned at the right loading point 12R, the operator depresses the switch side button 33e of the input device 33, and depresses the go-button 33d, a travel command for withdrawing from the left loading point 12L, which is the loading point 12 on the opposite side, is given to the unmanned vehicle 20', which exists at the left loading point 12L, thereby the unmanned vehicle 20' can travel from the left loading point 12L to the exit point 15 along the exit course 17L.

Next, the processing to change and set the position of the loading point 12 will be explained with reference to the flowchart in FIG. 4D The processing to instruct position setting of a loading point as illustrated in FIG. 9 will also be explained.

(Instruction of Position Setting of Loading Point)

With the elapse of time, the position of excavation by the loading machine 30, or the features of the working face 1a, or the geographical features of the loading site 1 vary. Therefore, it is required to alter the position of the loading point 12 that was once set. When the loading point 12 is to be repositioned, the operator of the loading machine 30 defines the position of the loading point 12, and instructs position setting of the loading point 12. In other words, the operator operates the operation lever in the inside of the driver's cab to slew the upper slewing structure 30B to the side on which the loading point 12 is to be repositioned (for example, the side of the left loading point 12L). In this case, the operator need not be particularly aware of the "left side" or the "right side", and also need not instruct the "left loading" or the "right loading" by means of the left-right instruction button 33*a*. And, the operator, by operating the operation lever in the inside of the driver's cab, keeps the positron of the loading point 12 at a side where he desires to change the working machine 30C and depresses the spot button 33*b* of the input device 33 (step 112).

(Discrimination of Left-Right Loading Point)

The processing device 42 of the supervising apparatus 40 receives the position instruction signal transmitted from the loading machine 30 through the communication device 41. By receiving the position instruction signal, the processing device 42 judges that setting of the position of the loading point 12 has been instructed.

Next, the processing device 32 of the loading machine 30 finds the direction of the working machine 30C (the direction expressed by the vector v4) on the basis of the position P of the loading machine 30 and the position Q of the bucket of the working machine 30C that have been sent together with the position instruction signal, and in correlation between this direction of the working machine 30C (the direction expressed by the vector v4) and the direction of the boundary line 90 (the direction expressed by the vector v3), discriminates of which of the left and right loading points 12L and 12R the position setting has been instructed.

In the example illustrated in FIG. 9, since the z-component of the outer product between the vector v3 and the vector v4, i.e., v3×v4, is negative, it is determined that the working machine 30C of the loading machine 30 has been positioned on the side of the left loading point 12L, and it is judged that setting of repositioning the left loading point 12L to a new "left loading point 12L'" has been instructed (step 113).

(Generation of Travel Route)

In this way, when it has been judged that setting of repositioning the left loading point 12L to, for example, the "left loading point 12L'", the processing device 42 sets the position Q of the bucket of the working machine 30C sent from the loading machine 30 as the position of the "left loading point 12L'". And, the processing device 42 generates a new travel route 101 which allows the unmanned vehicle 20 to travel from the entrance point 11 to this set left loading point 12L' through the waiting point 14. By the processing device 42, with the position of the loading machine 30, the position of the unmanned vehicle 20, and another travel route 10R being taken into account, an optimum, new travel route 101 is generated such that the unmanned vehicle 20 and the loading machine 30 will not interfere with each other. With a new travel route 101 being generated, a new vector v1' indicating the direction of approach of the unmanned vehicle 20 to a new left loading point 12L' is obtained. However, the orientation of the vector v1' is exactly reverse to the direction in which the unmanned vehicle 20 approaches to the left loading point 12L' in the backward travel mode (step 114).

(Re-Calculation of Boundary Line)

Next, the processing device 42 re-calculates the boundary line 90. In the example in FIG. 9, since the vector v1 indicating the direction of approach to the left loading point 12L has been altered to the vector v1' indicating the direction of approach to a new left loading point 12L', on the basis of this new vector v1' and the vector v2 indicating the direction of approach to the right loading point 12R, the same calculation as that with the aforementioned equation (1), (v3'=(v1'+v2)/2), is performed to re-calculate the boundary line 90. A new boundary line 90' is obtained as a line segment which passes the position of the loading machine 30 (the center position P), having a direction expressed by the vector v3'. In this way, every time the position of the loading point 12 is altered, a new travel route 10'L is generated, and the boundary line 90' is newly re-generated (step 115).

(Deletion of Former Loading Point and Travel Route on the Same Side)

In this manner, once, for example, the left loading point 12L' is newly set, the data for the former loading point 12L on the same side (the left side), and the data for the former travel route 10L leading to this former loading point 12L are deleted from the contents of the storage (step 116). The boundary line 90 may be generated by the supervising apparatus 40 with the necessary information being transmitted from the loading machine 30 to the supervising apparatus 40, or the loading machine 30 may generate the boundary line 90, and transmit the information about the vector of the boundary line 90 to the supervising apparatus 40.

Second Embodiment

In the first embodiment, the case where the boundary line 90 (vector v3) is generated on the basis of the information about the direction of approach to the left or right loading point 12L or 12R (the vector v1 or v2) has been taken as an example for explanation.

However, it is also possible to generate the boundary line 90 by recognizing the features of the loading site 1, and on the basis of the information about the features of the loading site 1.

FIG. 10 is a drawing illustrating the method for generating the boundary line 90 on the basis of the information about the features of the loading site 1. In this case, the loading machine 30 is provided with loading site feature recognition means 37 (indicated with a dotted line in FIG. 2).

The loading site feature recognition means 37 is constituted by, for example, laser light distance measurement means, which scans the laser beam on the working face 1*a* in front of the loading machine 30 to recognize the features of the working face 1*a*. Generation of the boundary line 90 through feature recognition of the working face 1*a* is effected by taking the following steps.

1) First, with the use of the loading site feature recognition means 37, recognize the features of the working face 1*a*.
2) Next, to the point at which the loading machine 30 is to excavate the working face 1*a*, in other words, the point of the working face 1*a* that is the nearest to the loading machine 30, draw a line S from the center position P of the loading machine 30.
3) Find the point R where the line S intersects the working face 1*a*, and calculate the points SL and SR which are equally distant from the point R, being provided on the left and right sides of the point R on the features of the working face 1*a*, respectively.
4) Calculate the vector v3, which is the sum of the vector v5, which is oriented from the point R to the point SL, and the vector v6, which is oriented from the point R to the point SR.
5) Move the vector v3 obtained in the step 4) above such that it passes through the center position P of the loading machine 30, and calculate the line segment after the movement as the boundary line 90.

Next, the case where the position of the loading point 12 is set will be explained with reference to the flowchart shown in FIGS. 11A and 11B

Every time the loading machine 30 alters the excavation position, a boundary line 90 is generated, and on the left and right sides of the boundary line 90, the loading points 12L and 12R are set. The boundary line 90 may be generated by the supervising apparatus 40 with the necessary information being transmitted from the loading machine 30 to the supervising apparatus 40, or the loading machine 30 may generate the boundary line 90 and transmit the information about the vector of the boundary line 90 to the supervising apparatus 40.

(Generation of Boundary Line)

First, the boundary line 90 is generated by taking the procedure as described in the steps 1) to 4) (step 201).

(Instruction of Position Setting of Loading Point on One Side)

Next, the operator defines the position of the loading point 12 on one side of the left and right sides for instructing position setting of the loading point 12 on one side. In other words, the operator slews the upper slewing structure 30B to one side (for example, to the side of the right loading point 12R). In this case, the operator need not be particularly aware of the "left side" or the "right side", and also need not instruct the "left loading" or the "right loading" by means of the left-right instruction button 33a. And, the operator operates the operation lever in the inside of the driver's cab to reposition the loading point 12, and with the working machine 30C being positioned on one side, depresses the spot button 33b of the input device 33 (step 202).

(Discrimination of Left-Right Loading Point)

The processing device 42 of the supervising apparatus 40 receives the position instruction signal transmitted from the loading machine 30 through the communication device 41. The processing device 42 judges that setting the position of the loading point 12 has been instructed.

Next, the processing device 42 finds the direction of the working machine 30C (the direction expressed by the vector v4) on the basis of the position P of loading machine 30 and the position Q of the bucket of the working machine 30C that have been transmitted together with the position instruction signal, and in correlation between this direction of the working machine 30C (the direction expressed by the vector v4) and the direction of the boundary line 90 (the direction expressed by the vector v3), discriminates of which of the left and right loading points 12L and 12R the position setting has been instructed. In the example illustrated in FIG. 10 (note the working machine 30C is shown with a solid line), since the z-component of the outer product between the vector v3 and the vector v4, i.e., v3×v4, is positive, the processing device 42 determines that the working machine 30C of the loading machine 30 has been positioned on the side of the right loading point 12R, and judges that position setting of the right loading point 12R has been instructed (step 203).

(Generation of Travel Route)

In this manner, when the processing device 42 judges that position setting of, for example, the right loading point 12R has been instructed, the processing device 42 sets the position Q of the bucket of the working machine 30C sent from the loading machine 30 as the position of the right loading point 12R. And, the processing device 42 generates the travel route 10R for leading the unmanned vehicle 20 to this set right loading point 12R. With the position of the loading machine 30, the position of the unmanned vehicle 20, and another travel route 10L being taken into account, an optimum travel route 10R which is free from interference is generated (step 204).

(Instruction of Position Setting of Loading Point on Opposite Side)

Next, by operating the operation lever in the driver's cab, the operator slews the upper slewing structure 30B to the side opposite to that at step 202 (for example, to the side of the left loading point 12L) to bring the working machine 30C to a position as shown with a dotted line in FIG. 10. In this case, the operator need be aware only of the "opposite side", and need not particularly aware of the "left side" or the "right side". In addition, the operator need not instruct the "left loading" or "right loading" by use of the left-right instruction button 33a. And, with the working machine 30C being positioned on that opposite side, the operator depresses the spot button 33b of the input device 33 (step 205).

(Discrimination of Left-Right Loading Point)

The processing device 42 of the supervising apparatus 40 receives the position instruction signal transmitted from the loading machine 30 through the communication device 41. The processing device 42 judges that position setting of the loading point 12 has been instructed.

Next, the processing device 42 finds the direction of the working machine 30C (the direction expressed by the vector v4') on the basis of the position P of the loading machine 30 and the position Q' of the working machine 30C that have been sent together with the position instruction signal, and in correlation between this direction of the working machine 30C (the direction expressed by the vector v4') and the direction of the boundary line 90 (the direction of the vector v3), discriminates of which of the left and right loading points 12L and 12R the position setting has been instructed.

In the example illustrated in FIG. 10 (note the working machine 30C is shown with a dotted line), since the z-component of the outer product between the vector v3 and the vector v4', i.e., v3×v4', is negative, the processing device 42 determines that the working machine 30C of the loading machine 30 has been positioned on the side of the left loading point 12L, and judges that position setting of the left loading point 12L has been instructed (step 206).

(Generation of Travel Route)

In this manner, when the processing device 42 judges that position setting of the left loading point 12L has been instructed, the processing device 42 sets the position Q' of the bucket of the working machine 30C transmitted from the loading machine 30 as the position of the left loading point 12L. And, the processing device 42 generates the travel route 10L for leading the unmanned vehicle 20 (another unmanned vehicle different from the unmanned vehicle 20 shown in FIG. 10) to this set left loading point 12L. With the position of the loading machine 30, the position of the unmanned vehicle 20, and another travel route 10R being taken into account, the processing device 42 generates an optimum travel route 10L which is free from interference (step 207).

The processing in the case of giving a travel command to the unmanned vehicle 20 is performed in the same manner as that in the step 109 to step 111 shown in FIG. 4C (Re-Calculation of Boundary Line)

With the elapse of time, the geographical features of the loading site 1 vary. Therefore, in FIG. 10, the loading point 12 and the direction of approach to that loading point 12 may be altered with the center position P of the loading machine 30 being kept as it is. In this case, by performing the same calculation as that explained with FIG. 9 in the first embodiment, the boundary line 90 can be altered to a new boundary line 90'.

In the respective embodiments as described above, information is sent from the loading machine 30 to the supervising apparatus 40, and a travel command is sent from the supervising apparatus 40 to the unmanned vehicle 20, however, the function of the supervising apparatus 40 may be provided for the loading machine 30 in order to implement direct communication between the loading machine 30 and the unmanned vehicle 20.

Figure 1:
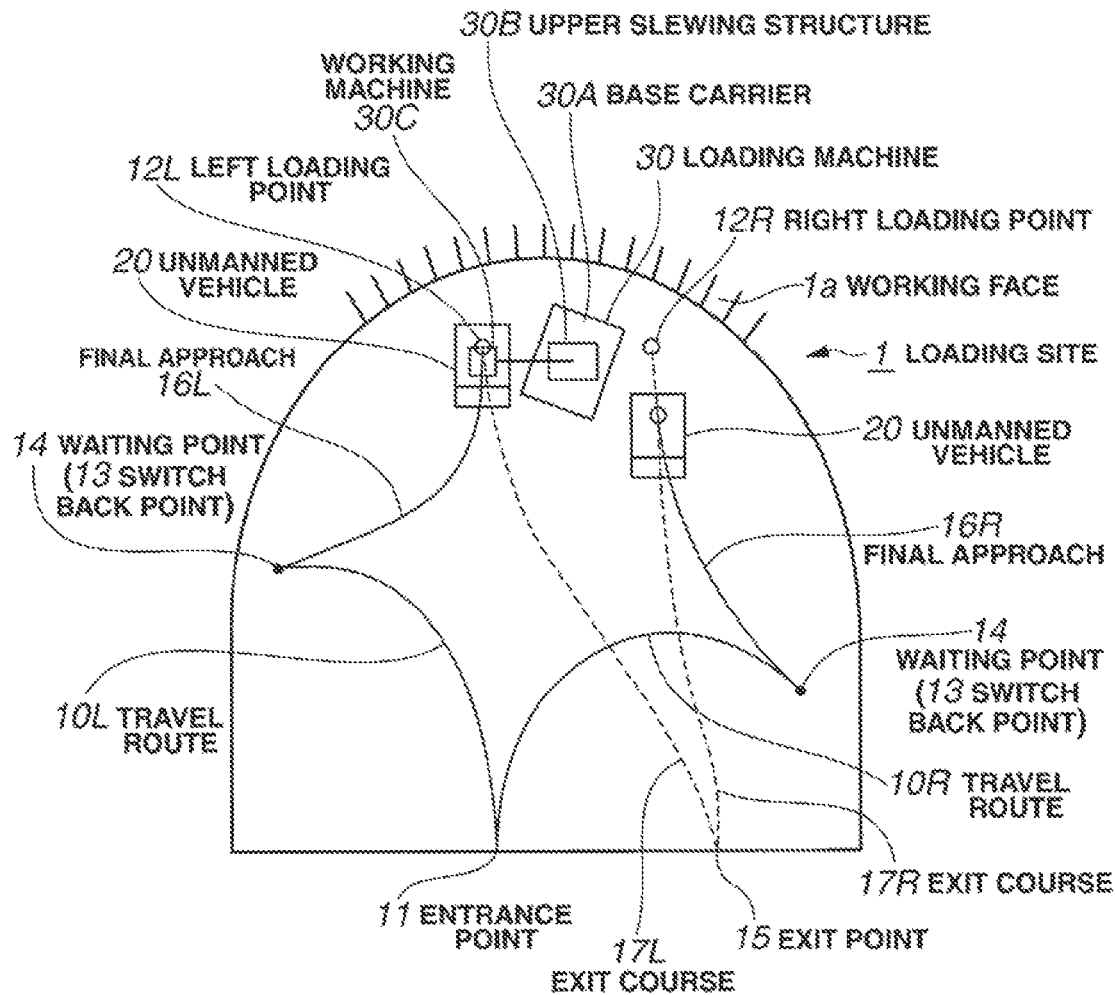
FIG. 1 is a top view of a loading site.
Figure 2:
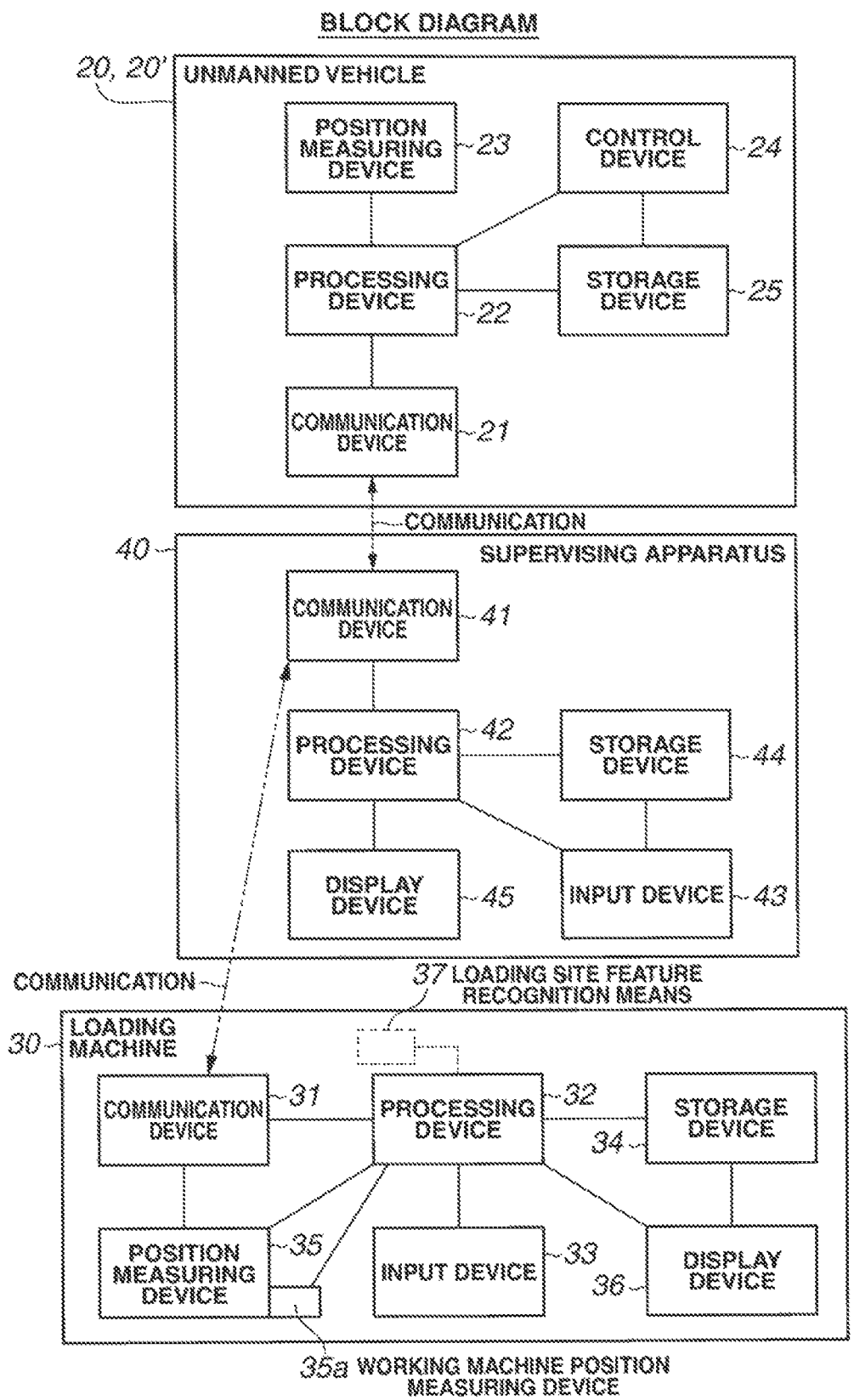
FIG. 2 is a block diagram of a vehicle drive system of the embodiment.
Figure 3:
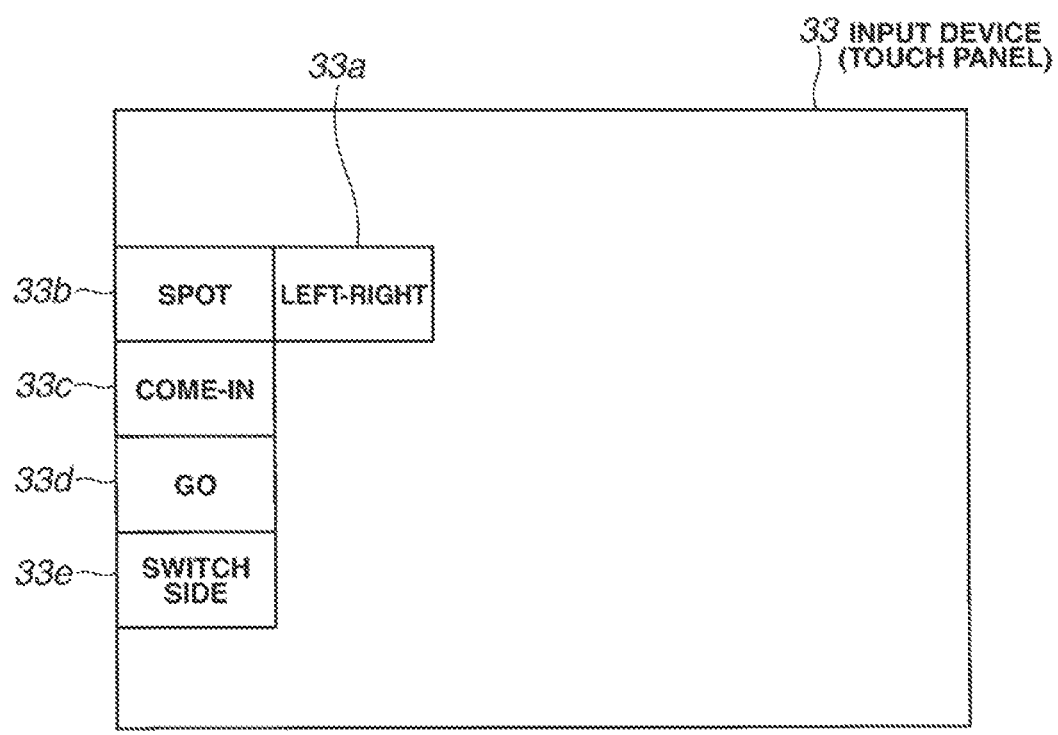
FIG. 3 is a drawing illustrating the detail of a configuration of an input device of a loading machine.
Figure 4A:
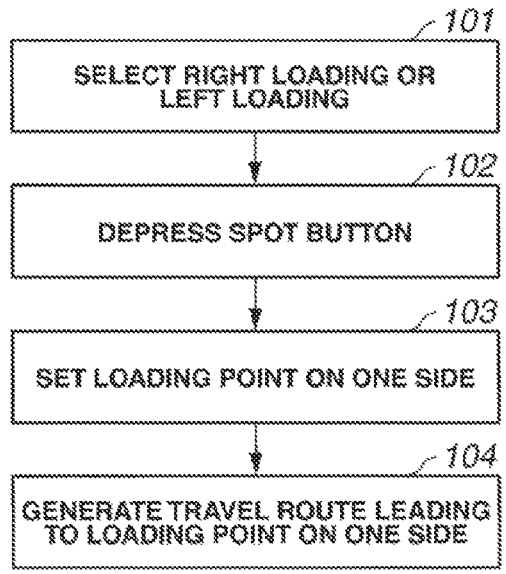
FIGS. 4A, 4B, 4C, and 4D are flowcharts illustrating the procedure for the processing to be implemented in a travel control system of the present embodiment.
Figure 4B:
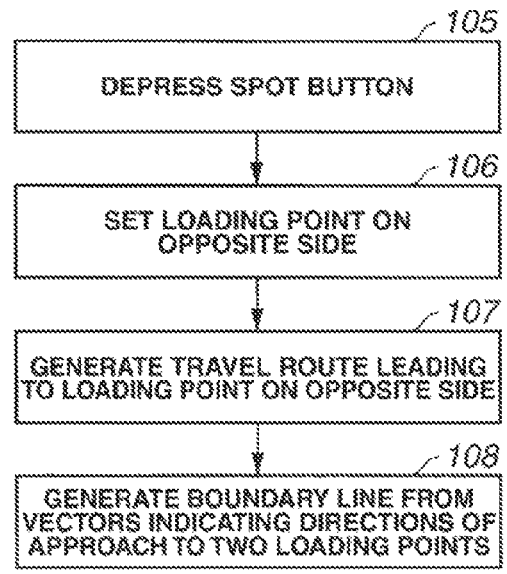
Figure 4C:
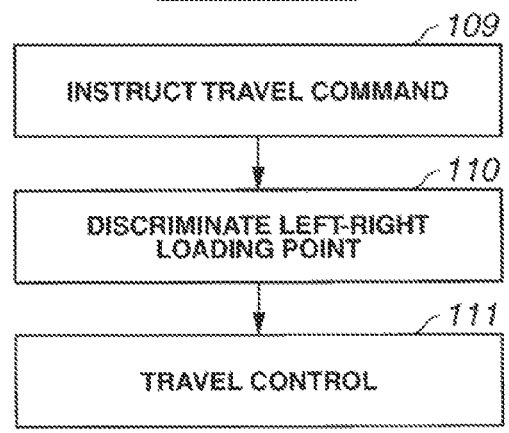
Figure 4D:
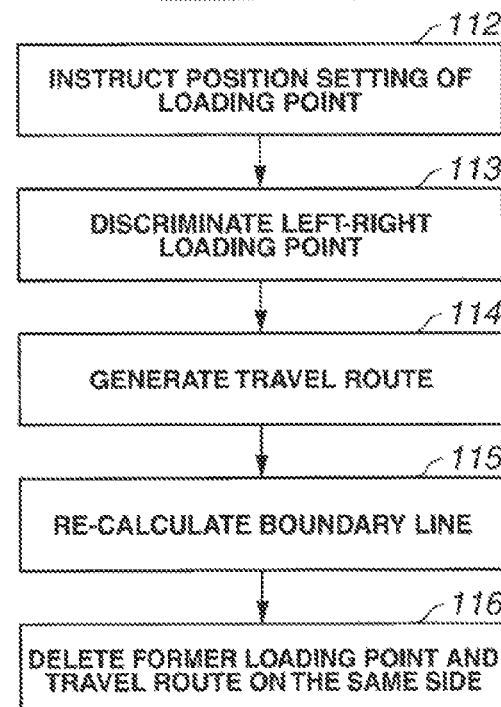
Figure 5:
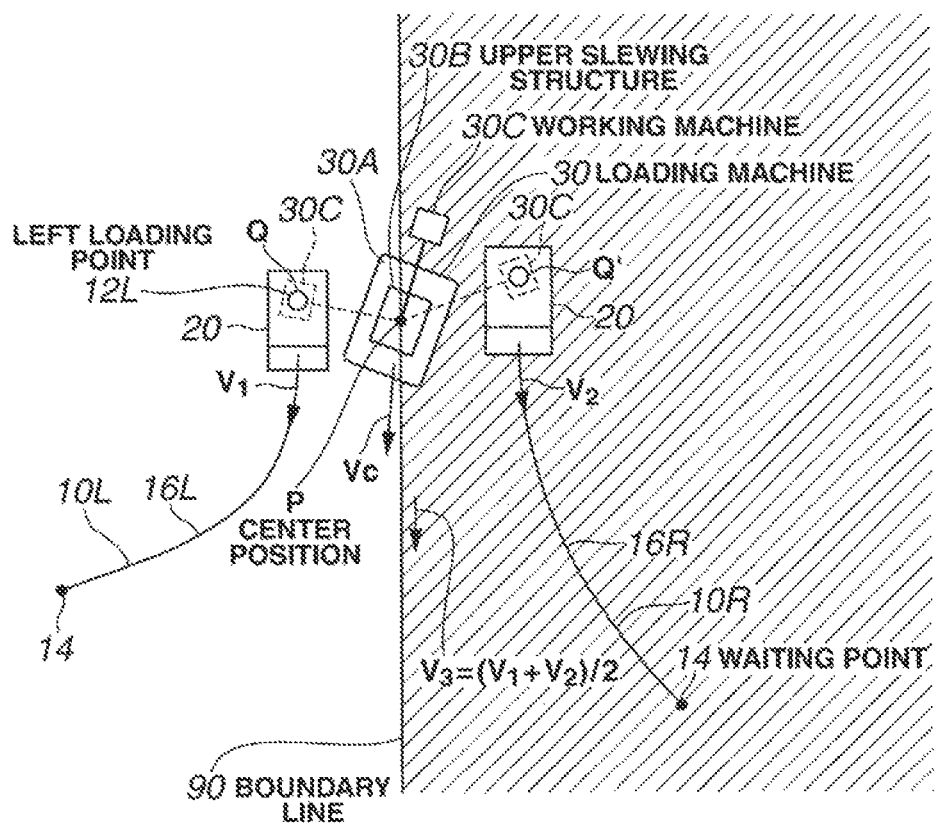
FIG. 5 is a drawing illustrating the processing to generate a boundary line.
Figure 6:
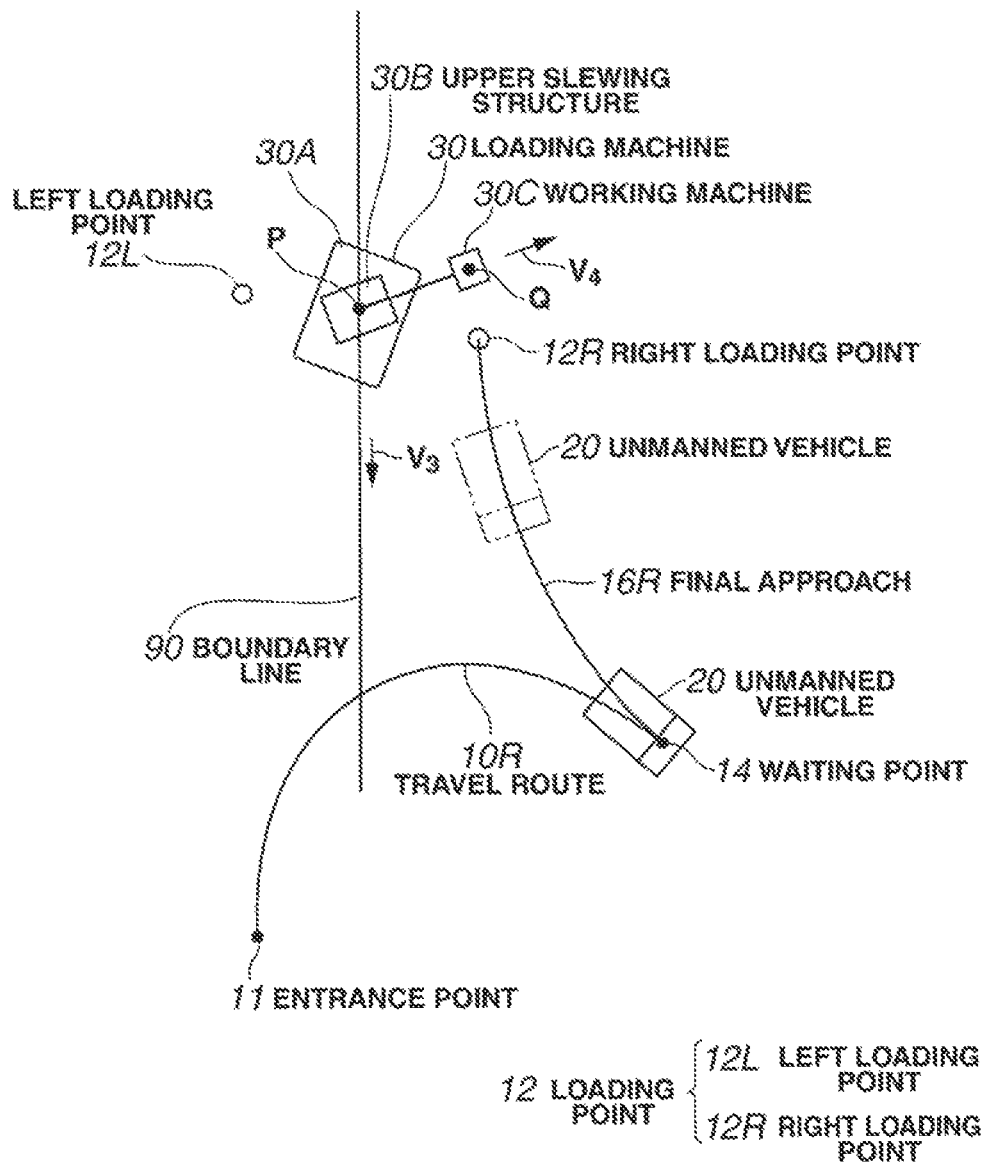
FIG. 6 is a drawing illustrating the processing to instruct a travel command for causing an unmanned vehicle to approach to a loading point.
Figure 7:
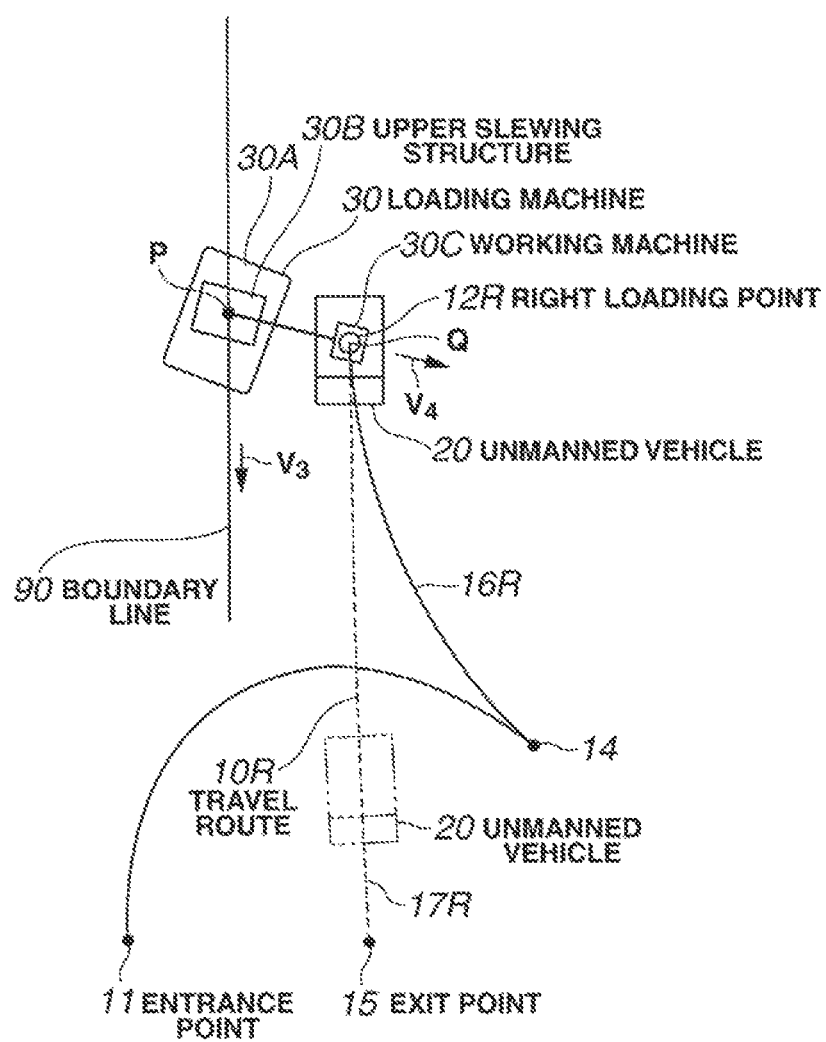
FIG. 7 is a drawing illustrating the processing to instruct a travel command for causing an unmanned vehicle to withdraw from a loading point.
Figure 8:
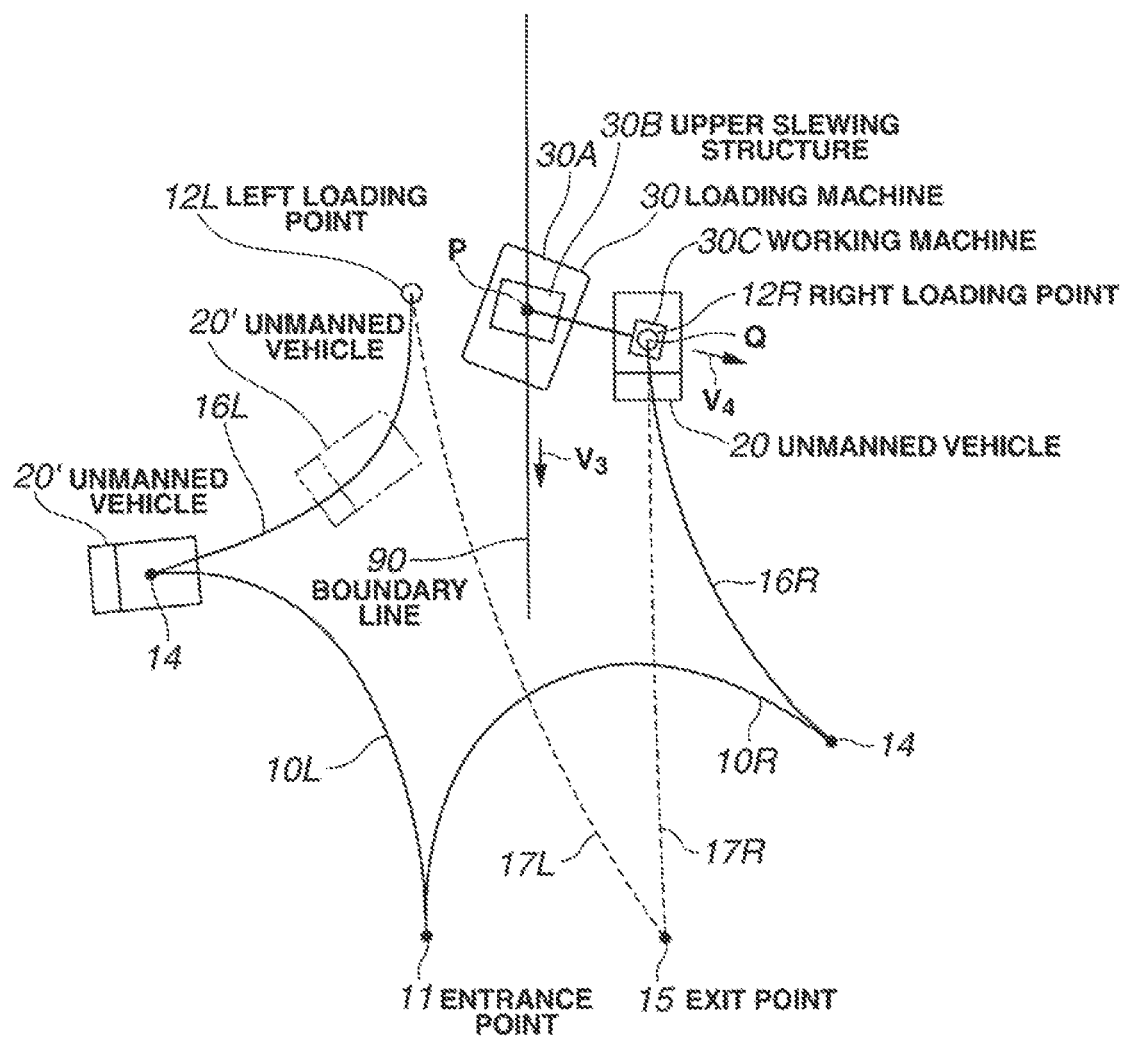
FIG. 8 is a drawing illustrating the processing to instruct a travel command for causing an unmanned vehicle on the opposite side to approach to a loading point.
Figure 9:
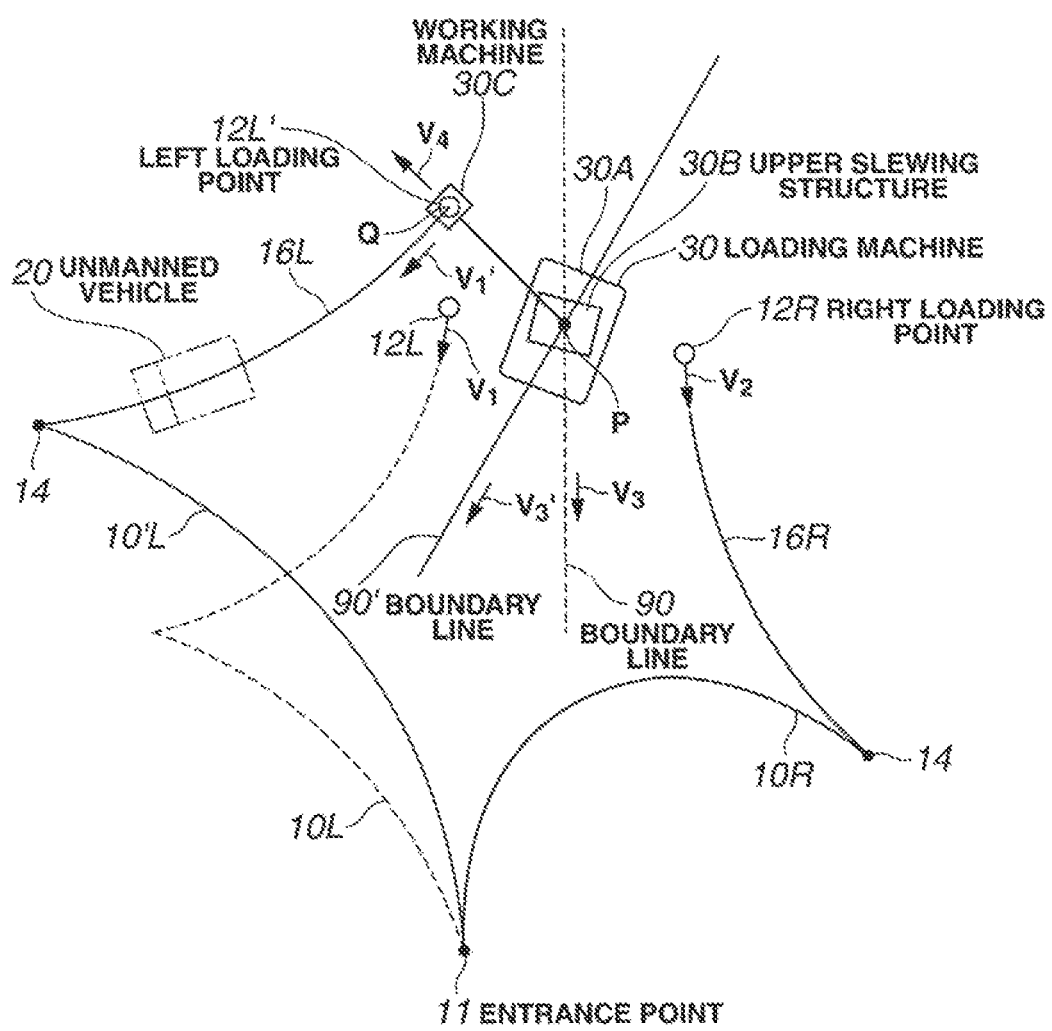
FIG. 9 is a drawing illustrating the processing to instruct position setting of a loading point.
Figure 10:
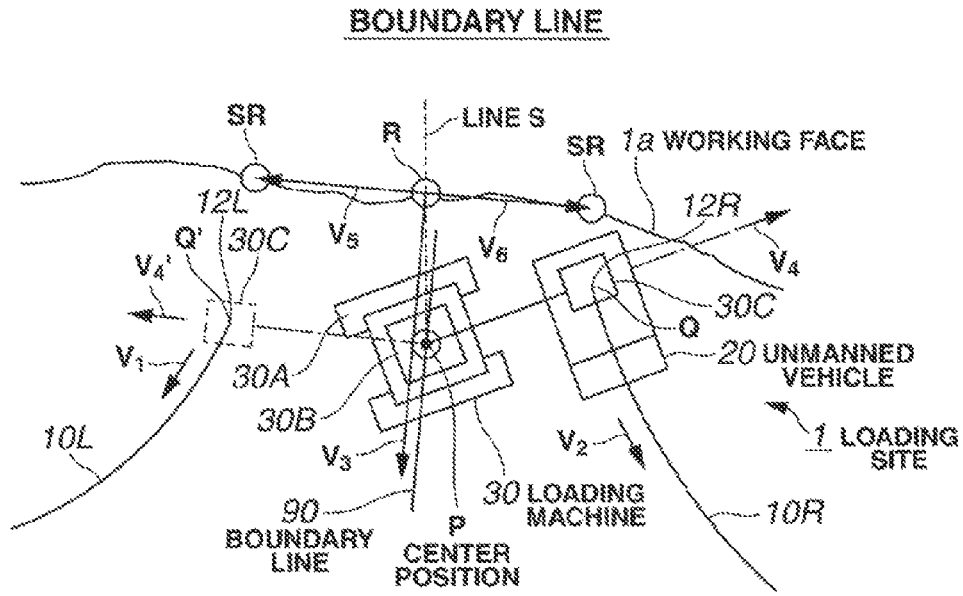
FIG. 10 is a drawing illustrating the processing to generate a boundary line on the basis of the information about the features of the loading site.
Figure 11A:
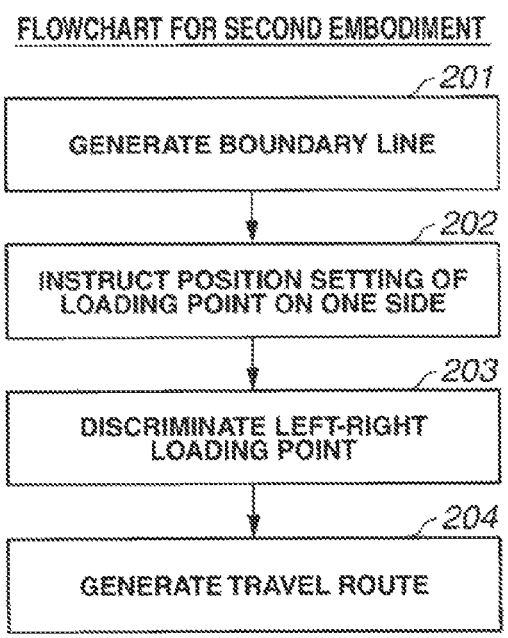
FIGS. 11A and 11B are flowcharts illustrating the procedure for the processing to set the position of the loading point.
Figure 11B:
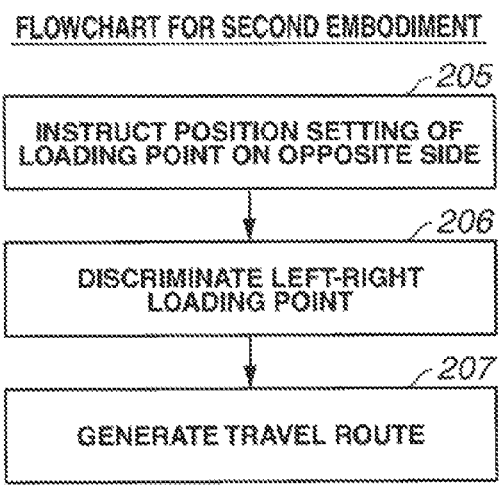
Figure 12:
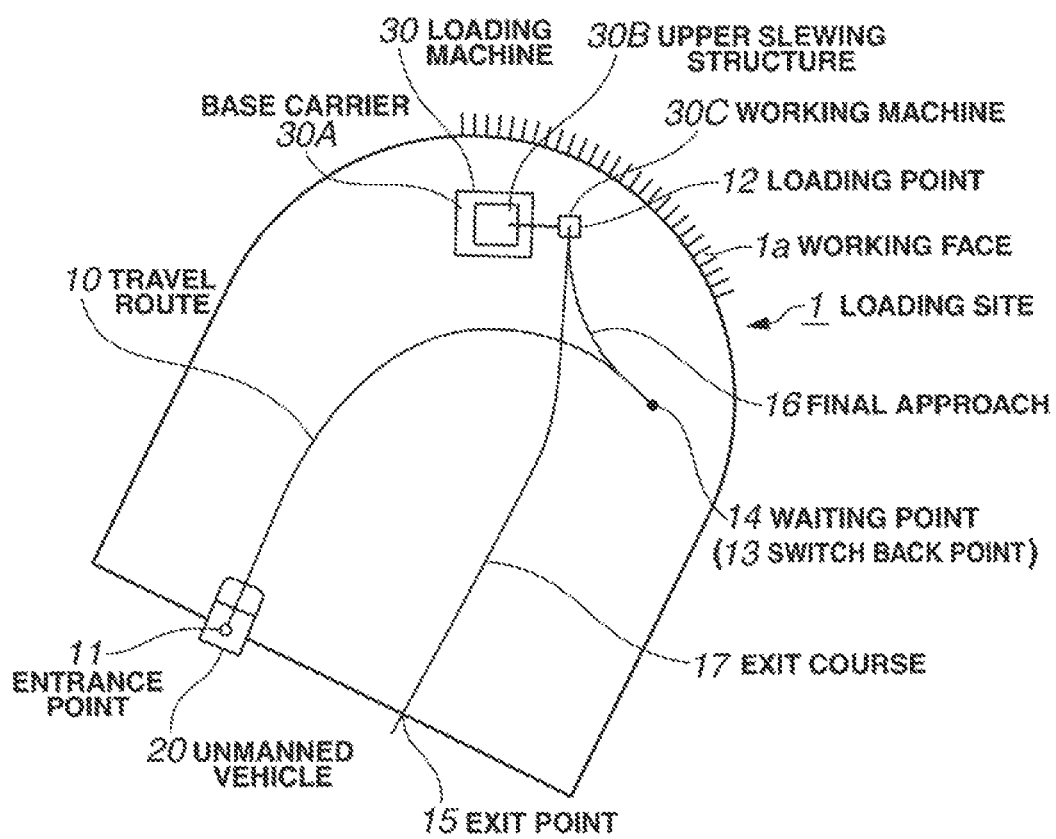
FIG. 12 is a drawing illustrating single-side loading.

The invention claimed is:

1. An unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine performs loading onto the unmanned vehicle is leftward or rightward with respect to the loading machine, comprising:
  boundary line generation means for, on the basis of information about the direction of approach to the left or right loading point of the unmanned vehicle, generating a boundary line for discriminating whether the working machine of the loading machine has been positioned on the side of the left loading point or positioned on the side of the right loading point;
  detection means for detecting the orientation or position of the working machine of the loading machine;
  discrimination means for, in correlation between the orientation or position of the working machine that has been detected by the detection means and the direction or position of the boundary line, discriminating whether the working machine of the loading machine has been positioned on the side of the left loading point or positioned on the side of the right loading point;
  travel command instruction means for instructing a travel command; and
  travel control means for, when a travel command is instructed by the travel command instruction means, giving a travel command to the unmanned vehicle which is to perform loading at the loading point on the side which has been determined through the discrimination means.

2. An unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine in a loading site performs loading onto the unmanned vehicle is leftward or rightward with respect to the loading machine, comprising:
  boundary line generation means for, on the basis of information about the features of the loading site, generating a boundary line for discriminating whether the working machine of the loading machine has been positioned on the side of the left loading point or positioned on the side of the right loading point;
  detection means for detecting the orientation or position of the working machine of the loading machine;
  discrimination means for, in correlation between the orientation or position of the working machine that has been detected by the detection means and the direction or position of the boundary line, discriminating whether the working machine of the loading machine has been positioned on the side of the left loading point or positioned on the side of the right loading point;
  travel command instruction means for instructing a travel command; and
  travel control means for, when a travel command is instructed by the travel command instruction means, giving a travel command to the unmanned vehicle which is to perform loading at the loading point on the side which has been determined through the discrimination means.

3. A drive control method for an unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine performs loading onto the unmanned vehicle is leftward or rightward with respect to the loading machine, characterized by comprising:
  a boundary line generation step of generating a boundary line for discriminating whether the working machine of the loading machine has been positioned on the side of the left loading point or positioned on the side of the right loading point;
  a travel command instruction step of instructing a travel command;
  a discrimination step of, in correlation between the orientation or position of the working machine when the travel command is instructed and the direction or position of the boundary line, discriminating whether the working machine of the loading machine has been positioned on the side of the left loading point or positioned on the side of the right loading point; and
  a travel control step of giving a travel command to the unmanned vehicle which is to perform loading at the loading point on the side which has been determined.

4. The drive system for unmanned vehicle of claim 1, wherein the travel command is a travel command for causing the unmanned vehicle to approach to the loading point or for causing the unmanned vehicle to withdraw from the loading point.

5. An unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine performs loading onto the unmanned vehicle is leftward or rightward with respect to the loading machine, comprising:

boundary line generation means for, on the basis of information about the direction of approach to the left or right loading point of the unmanned vehicle, generating a boundary line for discriminating whether the working machine of the loading machine has been positioned on the side of the left loading point or positioned on the side of the right loading point;

detection means for detecting the orientation or position of the working machine of the loading machine;

discrimination means for, in correlation between the orientation or position of the working machine that has been detected by the detection means and the direction or position of the boundary line, discriminating whether the working machine of the loading machine has been positioned on the side of the left loading point or positioned on the side of the right loading point;

loading point position setting instruction means for defining the position of the loading point to instruct position setting of the loading point; and travel command generation means for, when the loading point position setting instruction means instructs position setting of the loading point, setting the position of the loading point on the side which has been determined through the discrimination means, as the defined position, and generate a travel route to the loading point.

6. An unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine in a loading site performs loading onto the unmanned vehicle is leftward or rightward with respect to the loading machine, comprising:

boundary line generation means for generating, on the basis of information about the features of the loading site, a boundary line for discriminating whether the working machine of the loading machine has been positioned on the side of the left loading point or positioned on the side of the right loading point;

detection means for detecting the orientation or position of the working machine of the loading machine;

discrimination means for, in correlation between the orientation or position of the working machine that has been detected by the detection means and the direction or position of the boundary line, discriminating whether the working machine of the loading machine has been positioned on the side of the left loading point or positioned on the side of the right loading point;

loading point position setting instruction means for defining the position of the loading point to instruct position setting of the loading point; and travel command generation means for, when the loading point position setting instruction means instructs position setting of the loading point, setting the position of the loading point on the side which has been determined through the discrimination means, as the defined position, and generate a travel route to the loading point.

7. The unmanned vehicle drive system of claim 5, wherein, every time the position of the loading point is altered, the boundary line is re-generated.

8. A drive control method for unmanned vehicle drive system for causing an unmanned vehicle to travel to a left loading point or a right loading point along a travel route in accordance with a travel command, the left loading point or the right loading point being set in correspondence with whether the direction of approach of the unmanned vehicle to a loading point where a working machine of a loading machine performs loading onto the unmanned vehicle is leftward or rightward with respect to the loading machine, comprising:

a boundary line generation step of generating a boundary line for discriminating whether the working machine of the loading machine has been positioned on the side of the left loading point or positioned on the side of the right loading point;

a loading point position setting instruction step of defining the position of the loading point to instruct position setting of the loading point;

a discrimination step of, in correlation between the orientation or position of the working machine when position setting of the loading point is instructed and the direction or position of the boundary line, discriminating whether the working machine of the loading machine has been positioned on the side of the left loading point or positioned on the side of the right loading point; and a travel command generation step of setting the position of the loading point on the side which has been determined, as the defined position, and generating a travel route to the set loading point.

9. The drive control method for unmanned vehicle drive system of claim 8, wherein, every time the loading point is altered, the boundary line is re-generated.

10. The drive system for unmanned vehicle of claim 2, wherein the travel command is a travel command for causing the unmanned vehicle to approach to the loading point or for causing the unmanned vehicle to withdraw from the loading point.

11. The drive control method for unmanned vehicle drive system of claim 3, wherein the travel command is a travel command for causing the unmanned vehicle to approach to the loading point or for causing the unmanned vehicle to withdraw from the loading point.

12. The unmanned vehicle drive system of claim 6, wherein, every time the position of the loading point is altered, the boundary line is re-generated.

* * * * *